United States Patent
Tatebayashi et al.

(10) Patent No.: US 6,917,684 B1
(45) Date of Patent: Jul. 12, 2005

(54) METHOD OF ENCRYPTION AND DECRYPTION WITH BLOCK NUMBER DEPENDANT KEY SETS, EACH SET HAVING A DIFFERENT NUMBER OF KEYS

(75) Inventors: Makoto Tatebayashi, Takarazuka (JP); Kaoru Yokota, Ashiya (JP); Motoji Ohmori, Hirakata (JP); Fumihiko Sano, Fuchu (JP); Naoki Endo, Fuchu (JP)

(73) Assignees: Matsushita Electric Industrial Co., Ltd., Osaka-fu (JP); Kabushiki Kaisha Toshiba, Kanagawa-ken (JP)

(*) Notice: Subject to any disclaimer, the term of this patent is extended or adjusted under 35 U.S.C. 154(b) by 1026 days.

(21) Appl. No.: 09/638,616

(22) Filed: Aug. 15, 2000

(30) Foreign Application Priority Data

Aug. 31, 1999 (JP) .......................... 11-245277

(51) Int. Cl.[7] .............. H04L 9/00; H04K 1/04; H04K 1/06
(52) U.S. Cl. .............. 380/44; 380/37; 380/47
(58) Field of Search ............... 380/28, 37, 44–45, 380/47

(56) References Cited

U.S. PATENT DOCUMENTS

| | | | | |
|---|---|---|---|---|
| 4,229,818 A | * | 10/1980 | Matyas et al. | 380/37 |
| 5,081,676 A | * | 1/1992 | Chou et al. | 705/55 |
| 5,351,299 A | * | 9/1994 | Matsuzaki et al. | 380/37 |
| 5,517,614 A | * | 5/1996 | Tajima et al. | 714/1 |
| 5,606,616 A | * | 2/1997 | Sprunk et al. | 380/29 |
| 5,825,889 A | * | 10/1998 | Dent | 380/270 |
| 6,459,792 B2 | | 10/2002 | Ohmori et al. | |
| 6,760,439 B1 | * | 7/2004 | Windirsch | 380/37 |
| 6,772,343 B1 | * | 8/2004 | Shimizu et al. | 713/193 |

FOREIGN PATENT DOCUMENTS

| | | |
|---|---|---|
| EP | 0 874 496 | 4/1998 |
| EP | 0 874 496 A | 10/1998 |
| EP | 874496 | 10/1998 |

OTHER PUBLICATIONS

Schneier, Bruce, "Applied Cryptography", 1996, John Wiley and Sons, Inc., Second Edition, pp. 225.*

Stallings, Williams, "Cryptography and Network Security: Principles and Practice" 2nd Edition, Cryptography and Network Security, 1999, XP002193563, ISB: 0–13–869017, pp. 61–62.

Charnes, C. et al., "Comments on Soviet Encryption Algorithm", Advances in Cryptology–Eurocrypt '94, Perugia, Italy. Springer Verlag, May 12, 1994, pp. 433–438, XOP002193564.

Stallings Williams, "Cryptography and Network Security: Principles and Practice" 2nd Edition, Cryptography and Network Security, 1999, XP002193563, ISBN: 0–13–869017–0, pp. 61–62.

Charnes C et al., "Comments on Soviet Encryption Algorithm", Advances in Cryptology–Eurocrypt '94, Perugia, Italy. Springer Verlag, May 12, 1994, pp. 433–438, XP002193564.

* cited by examiner

Primary Examiner—Andrew Caldwell
Assistant Examiner—Matthew Henning

(57) ABSTRACT

The subkey data generating unit 101 has two different subkey key generation processes. When encrypting a $(T*n)^{th}$ plaintex block (where T denotes a predetermined cycle and n is a positive integer), sixteen sets of subkey data are generated. In all other cases, two sets of subkey data are generated. The encrypting unit 100 encrypts the plaintex using the generated sixteen or two sets of subkey data.

10 Claims, 14 Drawing Sheets

FIG.6

| COUNT VALUE | INPUT KEY DATA | SUBKEY DATA GENERATION TYPE |
|---|---|---|
| 0 | $EK(+) f(IV)$ | A |
| 1 | $EK(+) f(C_0)$ | B |
| 2 | $EK(+) f(C_1)$ | B |
| ... | ... | ... |
| $2^{10}-1$ | $EK(+) f(C_{2^{10}-2})$ | B |
| 0 | $EK(+) f(IV)$ | A |
| 1 | $EK(+) f(C_0)$ | B |
| 2 | $EK(+) f(C_1)$ | B |
| ... | ... | ... |
| $2^{10}-1$ | $EK(+) f(C_{2^{10}-2})$ | B |
| 0 | $EK(+) f(IV)$ | A |
| ... | ... | ... |

METHOD OF ENCRYPTION AND DECRYPTION WITH BLOCK NUMBER DEPENDANT KEY SETS, EACH SET HAVING A DIFFERENT NUMBER OF KEYS

This application is based on an application No. 11-245277 filed in Japan, the content of which is hereby incorporated by reference.

BACKGROUND OF THE INVENTION (1) Field of the Invention

The present invention relates to a cryptographic technique that encrypts a plaintext to generate a ciphertext and then decrypts the ciphertext to obtain the original plaintext.

(2) Description of the Related Art

In recent years, it is becoming increasingly common to encrypt important information before transmission to prevent third parties from knowing its content. More secure forms of encryption are therefore being sought.

Japanese Laid-Open Patent Application No. H11-7239 teaches a data encryption apparatus that aims to achieve more secure encryption.

This data encryption apparatus divides a plaintext received from outside into a plurality of plaintext blocks and encrypts each plaintext block using key data to generate ciphertext blocks. When encrypting the first plaintext block, this data encryption apparatus uses key data obtained from outside the apparatus. For the second and following plaintext blocks, the data encryption apparatus updates the key data using the ciphertext block generated when encrypting the preceding plaintext block, and encrypts the present plaintext block using this updated key data.

The data encryption apparatus encrypts each plaintext block in the following way. The data encryption apparatus includes a subkey generating unit and first to eighth encrypting units. The subkey generating unit uses the key data to generate first to eighth subkeys. Each of these first to eighth subkeys are different. The first encrypting unit generates a first intermediate block from a plaintext block using the first subkey. The second encrypting unit generates a second intermediate block from the first intermediate block using the second subkey. The third to seventh encrypting units similarly generate third to seventh intermediate blocks from the second to sixth intermediate blocks using the third to seventh subkeys. The eighth encrypting unit generates a ciphertext block from the seventh intermediate block using the eighth subkey.

Each plaintext block is encrypted using key data that differs for each plaintext block. This makes it difficult to accumulate pairs of plaintexts that have been encrypted using the same key and the resulting ciphertexts. As a result, the security of the encryption against known plaintext attacks, such as differential cryptanalysis and linear cryptanalysis, is improved.

However, the subkey generating unit in this data encryption apparatus has to generate many different subkeys every time a plaintext block is encrypted. This has the drawback of lowering the speed of the cryptographic processing.

SUMMARY OF THE INVENTION

The present invention was conceived in view of the stated problem and has an object of providing an encryption apparatus that performs cryptographic processing which is fast and has a high degree of security against known plaintext attacks. The invention also aims to provide an encryption method, a decryption apparatus, a decryption method, and a recording medium that stores an encryption program and/or decryption program, each of which has the same effect.

The stated object can be achieved by an encryption method for use by an encryption apparatus that encrypts plaintext data composed of a plurality of blocks, the encryption method comprising: a block obtaining step for obtaining the plaintext data one block at a time in order from outside the encryption apparatus; a selecting step for selecting either a first mode or a second mode for a current block obtained in the block obtaining step according to how many blocks have been obtained; a key generating step for generating (1) a first group composed of a predetermined number n of different subkeys when the first mode is selected, and (2) a second group composed of less than n different subkeys when the second mode is selected; and an encrypting step for encrypting the current block by subjecting the current block to n conversion processes in order, wherein in the first mode, each of the n conversion processes is associated with a different subkey in the first group and is performed using the associated subkey, and in the second mode, the n conversion processes are associated with subkeys in the second group and are each performed using the associated subkey.

In the stated method, fewer subkeys are generated in the second mode than in the first mode. This suppresses decreases in processing speed caused by the generation of subkeys during the encryption of blocks.

Here, the selecting step may select (i) the first mode for blocks whenever a number of blocks that have been obtained is equal to a multiple of a predetermined value, and (ii) the second mode for all other cases.

In the stated method, the first mode is only selected for certain blocks in the plaintext data. The second mode is selected for all other blocks. This means that the second mode is selected more often that the first mode, and that the decreases in the cryptographic processing speed for the entire plaintext data composed of the blocks can be suppressed.

Here, the encryption apparatus may include an initial value storing means for storing an initial value, the encrypting step may encrypt the current block to generate a ciphertext block having a predetermined length, and the key generating step may generate the first group using the initial value in the first mode and generate the second group using the initial value and the ciphertext block most recently generated by the encrypting step in the second mode.

In the stated method, each plaintext block is encrypted using different key data. This makes it difficult for third parties to accumulate pairs of plaintexts encrypted using the same key and the resulting ciphertexts. This increases the security against known plaintext attacks, such as differential cryptanalysis and linear cryptanalysis.

The stated object can be achieved by a decryption method for use by a decryption apparatus that decrypts ciphertext data in ciphertext block units, the decryption method including: a block obtaining step for obtaining the ciphertext data one ciphertext block at a time in order from outside the decryption apparatus; a selecting step for selecting either a first mode or a second mode for use with a current ciphertext block obtained in the block obtaining step according to how many ciphertext blocks have been obtained; a key generating step for generating (1) a first group composed of a predetermined number n of different subkeys when the first mode is selected and (2) a second group-composed of less than n different subkeys when the second mode is selected;

and a decrypting step for decrypting the current ciphertext block by subjecting the current ciphertext block to n conversion processes in order, wherein in the first mode, each of the n conversion processes is associated with a different subkey in the first group and is performed using the associated subkey, and in the second mode, the n conversion processes are associated with subkeys in the second group and are each performed using the associated subkey.

In the stated method, fewer subkeys are generated in the second mode than in the first mode. This suppresses decreases in processing speed caused by the generation of subkeys during the decryption of ciphertext blocks.

The stated object can also be achieved by a decryption method for use by a decryption apparatus that decrypts ciphertext data in ciphertext block units, the decryption method comprising: a block obtaining step for obtaining the ciphertext data one ciphertext block at a time in order from outside the decryption apparatus; a selecting step for selecting either a first mode or a second mode for use with a current ciphertext block obtained in the block obtaining step according to how many ciphertext blocks have been obtained; a key generating step for generating (1) a first group composed of a predetermined number n of different subkeys when the first mode is selected and (2) a second group composed of less than n different subkeys when the second mode is selected; and a decrypting step for decrypting the current ciphertext block by subjecting the current ciphertext block to n conversion processes in order, wherein in the first mode, each of the n conversion processes is associated with a different subkey in the first group and is performed using the associated subkey, and in the second mode, the n conversion processes are associated with subkeys in the second group and are each performed using the associated subkey.

In the stated method, the first mode is only selected for certain blocks in the plaintext data. The second mode is selected for all other blocks. This means that the second mode is selected more often that the first mode and that the decreases in the decryption processing speed for the entire ciphertext data composed of the ciphertext blocks can be suppressed.

Here, the decryption apparatus may include an initial value storing means for storing an initial value, the key generating step generating the first group using the initial value in the first mode and generating the second group using the initial value and the ciphertext block obtained immediately before the current ciphertext block in the second mode.

In the stated method, each ciphertext block is decrypted using different key data. This makes it difficult for third parties to accumulate pairs of plaintexts encrypted using the same key and the resulting ciphertexts. This increases the security against known plaintext attacks, such as differential cryptanalysis and linear cryptanalysis.

As described above, the present invention achieves a similar level of security to the described conventional technology while improving the speed of the cryptographic processing. The invention suited to processes such as the secret communication of image and other information in real time. With the current demand for improvements in multimedia technology, this makes the effect of the invention especially significant.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 shows the correspondence between the count value, the input key data and the subkey data generating type;

DESCRIPTION OF THE PREFERRED EMBODIMENT

The following describes an encrypted communication system 5 according to a preferred embodiment of the present invention.

1. Construction of the Encrypted Communication System 5

Figure 1:
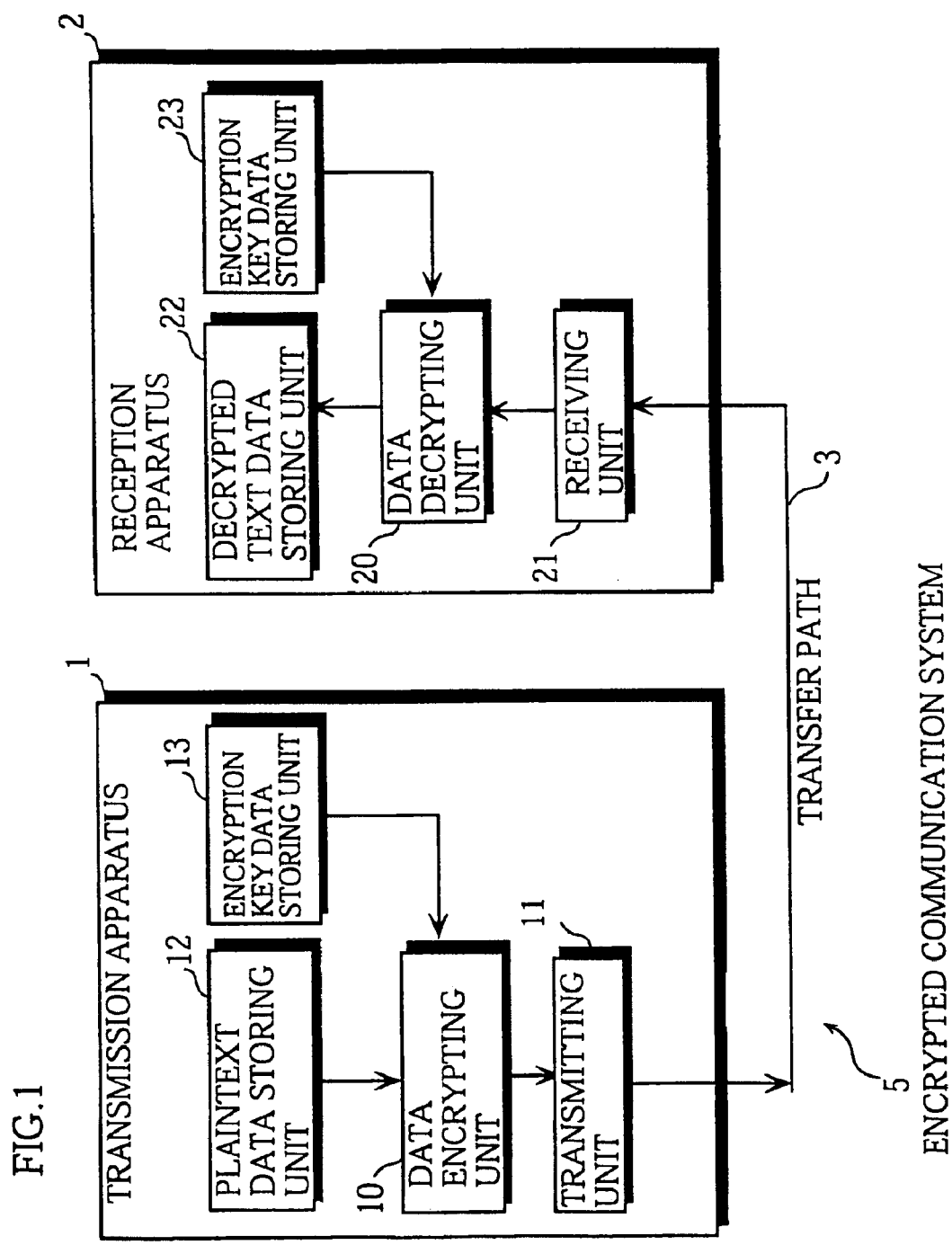
FIG. 1 is a block diagram showing the construction of an encrypted communication system 5 that is a preferred embodiment of the present invention.

As shown in FIG. 1, the encrypted communication system 5 is constructed of a transmission apparatus 1, a reception apparatus 2 and a transfer path 3. The transfer path 3 connects the transmission apparatus 1 and the reception apparatus 2.

The transmission apparatus 1 and the reception apparatus 2 are each provided beforehand with the same encryption key data EK. The transmission apparatus 1 encrypts the plaintext data P using the encryption key data EK to generate the ciphertext data C, and then transmits the generated ciphertext data C to the reception apparatus 2 via the transfer path 3. The reception apparatus 2 receives this ciphertext data C, decrypts the ciphertext data C using the encryption key data EK, and so generates the decrypted text data D. Here, the decrypting performed by the reception apparatus 2 is the inverse of the encrypting performed by the transmission apparatus 1, so that the decrypted text data D generated by the decrypting is the same as the plaintext data P.

1.1 Constructions of the Transmission Apparatus 1 and the Reception Apparatus 2

(1) Construction of the Transmission Apparatus 1

As shown in FIG. 1, the transmission apparatus 1 is constructed of a plaintext data storing unit 12, an encryption key data storing unit 13, a data encrypting unit 10, and a transmitting unit 11.

The plaintext data storing unit 12 stores the plaintext data P beforehand. This plaintext data P is digital data that includes at least 64 bits, and can be digitally encoded audio or image information, for example.

The encryption key data storing unit 13 stores 64-bit encryption key data EK in advance. The encryption key data EK is decided in advance for both the transmission apparatus 1 and the reception apparatus 2.

The data encrypting unit 10 reads the plaintext data P from the plaintext data storing unit 12 and the encryption key data EK from the encryption key data storing unit 13. The data encrypting unit 10 then encrypts the plaintext data P using the encryption key data EK to generate the ciphertext data C. The data encrypting unit 10 outputs the resulting ciphertext data C to the transmitting unit 11. This data encrypting unit 10 is described in detail later in this specification.

The transmitting unit 11 receives the ciphertext data C, performs a parallel-to-serial on the ciphertext data C, and then modulates and amplifies the converted data to generate signals. The transmitting unit 11 transmits these signals via the transfer path 3 to the reception apparatus 2.

(2) Construction of the Reception Apparatus 2

As shown in FIG. 1, the reception apparatus 2 is constructed of a decrypted text data storing unit 22, an encryption key data storing unit 23, a data decrypting unit 20, and a receiving unit 21.

The receiving unit 21 receives signals transmitted by the transmitting unit 11 of the transmission apparatus 1 via the transfer path 3, demodulates the signals, and performs a serial-to-parallel conversion to obtain the ciphertext data C. The receiving unit 21 outputs this ciphertext data C to the data decrypting unit 20.

The encryption key data storing unit 23 stores 64-bit encryption key data EK in advance. This encryption key data EK is the same as that stored by the encryption key data storing unit 13 in the transmission apparatus 1.

The data decrypting unit 20 receives the ciphertext data C and reads the encryption key data EK from the encryption key data storing unit 23. The data decrypting unit 20 decrypts the ciphertext data C using the encryption key data EK to generate the decrypted text data D. The data decrypting unit 20 writes this decrypted text data D into the decrypted text data storing unit 22. The decrypting performed by the data decrypting unit 20 is the inverse of the encrypting performed by the data encrypting unit 10. This means that the decrypted text data D is the same as the original plaintext data P. This data decrypting unit 20 is also described in detail later in this specification.

The decrypted text data storing unit 22 stores the decrypted text data D.

1.2 Construction of the Data Encrypting Unit 10

Figure 2:
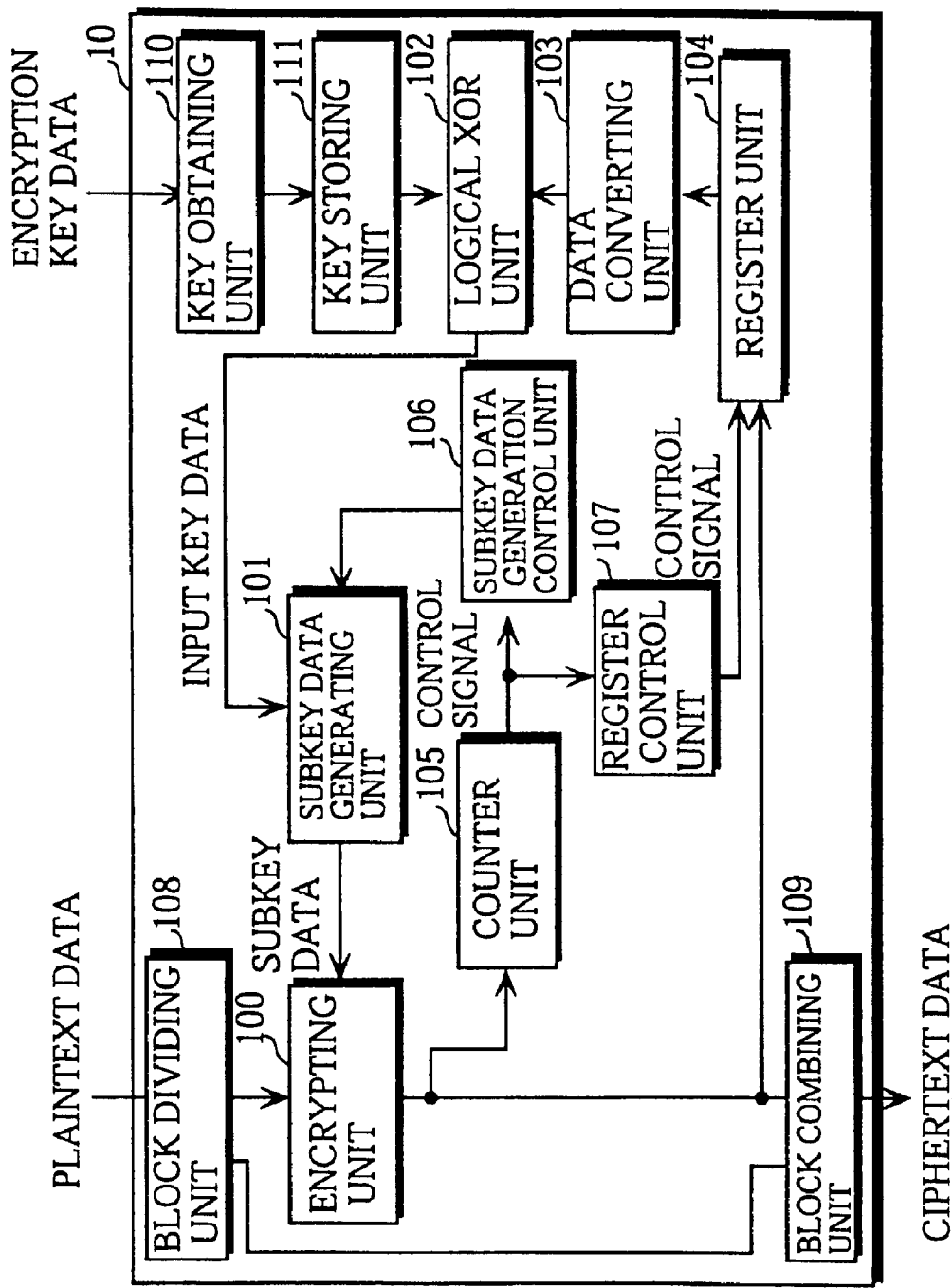
FIG. 2 is a block diagram showing the construction of the data encrypting unit 10 in the transmission apparatus 1.

As shown in FIG. 2, the data encrypting unit 10 is constructed of an encrypting unit 100, a subkey data generating unit 101, a logical XOR unit 102, a data converting unit 103, a register unit 104, a counter unit 105, a subkey data generation control unit 106, a register control unit 107, a block dividing unit 108, a block combining unit 109, a key obtaining unit 110, and a key storing unit 111.

(1) Block Dividing Unit 108

The block dividing unit 108 reads the plaintext data P from the plaintext data storing unit 12 and divides the plaintext data P in block units measured from the start of the plaintext data P to generate a plurality of plaintext blocks $P_t$ (where t=0,1,2 ...). Each plaintext block $P_t$ is 64 bits long. The block dividing unit 108 outputs these plaintext blocks $P_t$ sequentially to the encrypting unit 100. After outputting all of the plaintext blocks $P_t$, the block dividing unit 108 outputs information showing that output has been completed to the block combining unit 109.

(2) Key Obtaining Unit 110

The key obtaining unit 110 reads the encryption key data EK from the encryption key data storing unit 13 and writes the read encryption key data EK into the key storing unit 111.

(3) Key Storing Unit 111

The key storing unit 111 stores the encryption key data EK.

(4) Encrypting Unit 100

Figure 3:
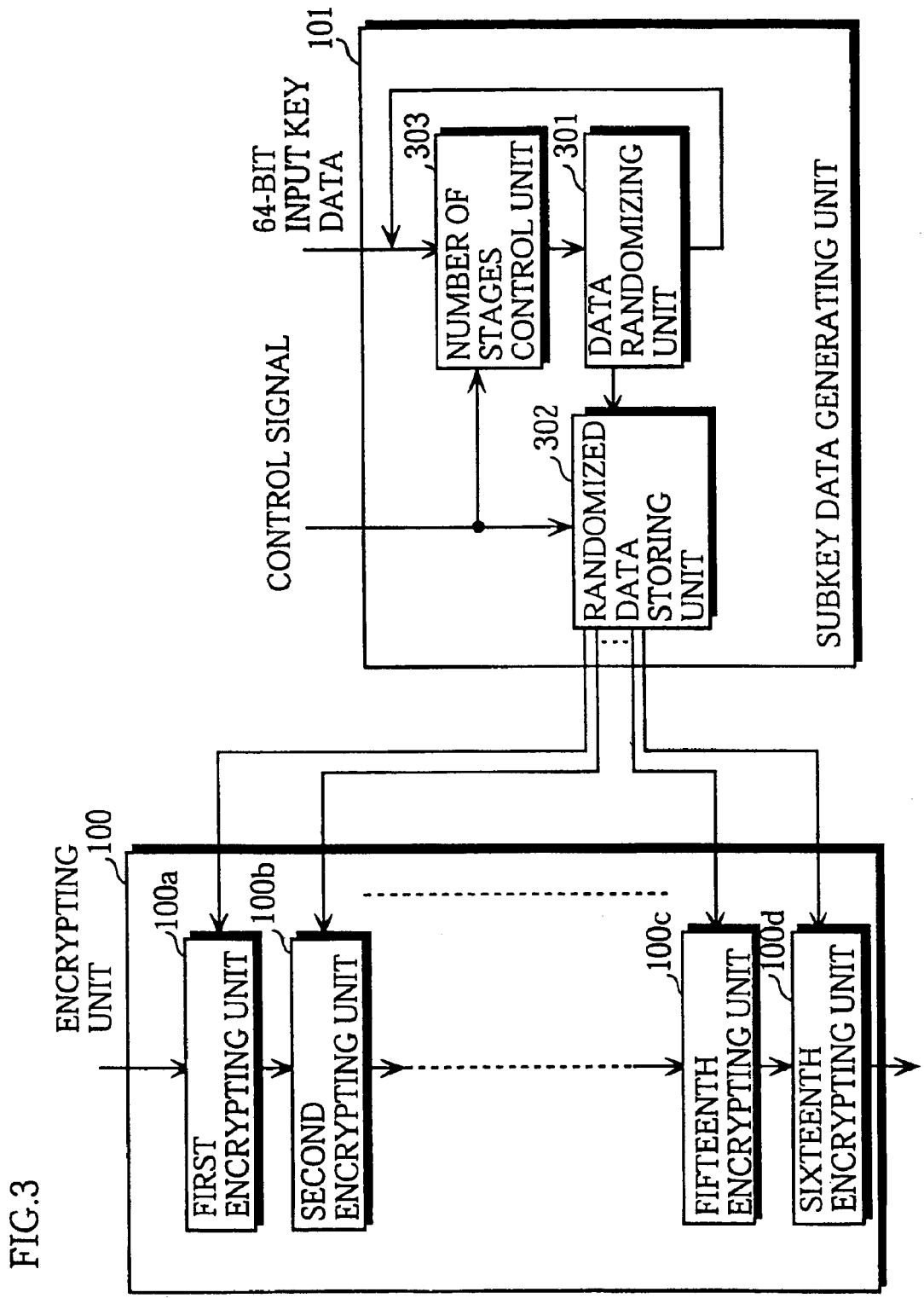
FIG. 3 is a block diagram showing the constructions of the encrypting unit 100 and the subkey data generating unit 101.

As shown in FIG. 3, the encrypting unit 100 includes a first encrypting unit 100a, a second encrypting unit 100b ... a fifteenth encrypting unit 100c and a sixteenth encrypting unit 100d.

The first encrypting unit 100a obtains a plaintext block $P_t$ from the block dividing unit 108 and first subkey data $SK_0$ from the subkey data generating unit 101. The first subkey data $SK_0$ is 32 bits long. The first encrypting unit 100a encrypts the obtained plaintext block $P_t$ using the first subkey data $SK_0$ to generate a first intermediate block. The first encrypting unit 100a outputs this first intermediate block to the second encrypting unit 100b.

The encryption performed by the first encrypting unit 100a is the data encryption part of a FEAL (Fast Data Encipherment Algorithm) encryption method, which is a well-known block encryption technique.

The second to fifteenth encrypting units respectively receive an intermediate block from a preceding encrypting unit in the first to fourteenth encrypting units and second to fifteenth subkey data $SK_1$ to $SK_{14}$ from the subkey data generating unit 101. Each of the second to fifteenth sets of subkey data $SK_1$ to $SK_{14}$ is 32 bits long. The second to fifteenth encrypting units respectively encrypt the received intermediate block using the second to fifteenth subkey data $SK_1$ to $SK_{14}$ to generate second to fifteenth intermediate blocks which are respectively outputted to the third to sixteenth encrypting units.

The sixteenth encrypting unit 100d obtains the fifteenth intermediate block from the fifteenth encrypting unit 100c and obtains the sixteenth subkey data $SK_{15}$ from the subkey data generating unit 101. The sixteenth subkey data $SK_{15}$ is also 32 bits long. The sixteenth encrypting unit 100d encrypts the obtained intermediate block using the sixteenth subkey data $SK_{15}$ to generate the ciphertext block $C_t$.

$$C_t = Enc(P_t, SK0_t) \qquad \text{Equation 7}$$

Here, the expression $Enc(P_t, SK0_t)$ shows that the plaintext block $P_t$ is encrypted using a group $SK0_t$ ($SK_0$ to $SK_{15}$) of subkey data that has been generated as part of the $t^{th}$ encrypting process.

The sixteenth encrypting unit 100d outputs the ciphertext block $C_t$ it has generated to the block combining unit 109.

When the generated ciphertext block $C_t$ has been outputted to the block combining unit 109, the encrypting unit 100 outputs information showing that the encryption of one plaintext block has been completed to the counter unit 105.

(5) Register Unit 104

The register unit 104 includes regions for storing a 64-bit initial value IV and 64-bit stored data $R0_t$. The value of the stored data $R0_t$ is set at the initial value IV in advance.

The register unit 104 receives the ciphertext block $C_t$ from the sixteenth encrypting unit 100$d$.

The register unit 104 receives a control signal from the register control unit 107. When the received control signal is "0" and a ciphertext block $C_t$ is received from the sixteenth encrypting unit 100$d$, the register unit 104 stores the ciphertext block $C_t$ as the stored data $R0_t$. When the received control signal is "1", the register unit 104 reads the initial value IV and stores the initial value IV as the stored data $R0_t$.

Putting this another way, suppose that T represents a predetermined cycle and that n is 0,1 . . . . When the $(T*n)^{th}$ plaintext block $P_t$ (where t=T*n) block is being encrypted, the register unit 104 resets the stored value $R0_t$ using the initial value IV that is set in advance. The value "T" is set in advance and is described later in this specification. When a plaintext block that is not a $(T*n)^{th}$ plaintext block (which is to say a plaintext block $P_t$ where t≠T*n) is encrypted, the received ciphertext block $C_t$ is stored as the stored data $R0_t$.

(6) Data Converting Unit 103

The data converting unit 103 reads the 64-bit stored data $R0_t$ from the register unit 104. When the encrypting unit 100 encrypts the $t^{th}$ plaintext block $P_t$, the data converting unit 103 reads the 64-bit data $R0_t$ shown below.

When t≠T*k (where k=0,1, . . . )

$$R0_t = C_{t-1} \qquad \text{Equation 1}$$

When t=T*k (where k=0,1, . . . )

$$R0_t = IV \qquad \text{Equation 2}$$

The data converting unit 103 subjects the read stored data $R0_t$ to a predetermined data conversion f to generate $S0_t$ $$S0_t = f(R0_t) \qquad \text{Equation 3}$$

In this specification, the expression f(X) represents the result of subjecting the input data X to the predetermined data conversion f. This predetermined data conversion f is a 13-bit rotated shift toward the MSB (most significant bit) of 64-bit data.

After this, the data converting unit 103 outputs the 64-bit data $S0_t$ that is generated by the conversion to the logical XOR unit 102.

(7) Logical XOR Unit 102

The logical XOR unit 102 receives the 64-bit data $S0_t$ from the data converting unit 103 and reads the encryption key data EK from the key storing unit 111.

The logical XOR unit 102 takes an XOR for each bit in the 64-bit data $S0_t$ and a corresponding bit in the encryption key data EK and so generates the 64-bit input key data $IK0_t$.

$$IK0_t = S0_t(+)EK \qquad \text{Equation 4}$$

Note that in the above equation, the symbol "(+)" is used to denote an XOR operation.

The logical XOR unit 102 outputs the input key data $IK0_t$ it has generated to the subkey data generating unit 101.

(8) Subkey Data Generating Unit 101

The subkey data generating unit 101 receives a control signal from the subkey data generation control unit 106 and the input key data $IK0_t$ from the logical XOR unit 102. This control signal shows whether or not a $(T*n)^{th}$ (where n=0, 1, . . . ) plaintext block is being encrypted. Such encrypting happens once in every predetermined cycle T. In the present example, the predetermined cycle T is set at $2^{10}$ encryption operations.

The subkey data generating unit 101 is capable of two (type A and type B) subkey generating processes. The type A subkey generating process has a heavy processing load while the type B has a light processing load. In accordance with the received control signal, the subkey data generating unit 101 selects one of the two types of subkey generating processes and performs the selected process using the input key data $IK0_t$ to generate sixteen sets of 32-bit subkey data (i.e., the first to sixteenth first subkey data $SK_0$ to $SK_{15}$).

When t≠T*k(k=0,1, . . . )

$$SK0_t = KGB(IK0_t) \qquad \text{Equation 5}$$

Here, the expression KGB(X) refers to sixteen sets of subkey data generated from the input key data $IK0_t$ by the type B subkey data generating process. These sixteen sets of subkey data are composed of two types of subkey data.

When t=T*k (k=0,1, . . . )

$$SK0_t = KGA(IK0_t) \qquad \text{Equation 6}$$

The expression KGA(X) represents the sixteen sets of subkey data that are generated by the type A subkey generating process. Each of these sixteen sets of subkey data is different from the others.

The subkey data generating unit 101 outputs sixteen sets of subkey data $SK_0$ to $SK_{15}$ it has generated to the first to sixteenth encrypting units of the encrypting unit 100.

FIG. 6 shows the relationship between the count value of the counter unit 105, the input key data received by the subkey data generating unit 101, and the type (A or B) of subkey generating process used by the subkey data generating unit 101. When the count value is "0", the input key data is generated using the encryption key data EK and the initial value IV, and the type A subkey generating process is used. Conversely, when the count value is "1" to "$2^{10}-1$", the input key data is generated using the encryption key data EK and the ciphertext block generated by the preceding encrypting process, and the type B subkey generating process is used.

As shown in FIG. 3, the subkey data generating unit 101 is constructed of the data randomizing unit 301, the randomized data storing unit 302, and the number of stages control unit 303.

(a) Data Randomizing Unit 301

The data randomizing unit 301 receives 64-bit data from the number of stages control unit 303, performs a predetermined data randomizing process on this data, and so generates 32-bit subkey data SK and 64-bit randomized data. The data randomizing unit 301 outputs the 32-bit subkey data SK to the randomized data storing unit 302 and the generated 64-bit randomized data to the number of stages control unit 303.

Figure 4:
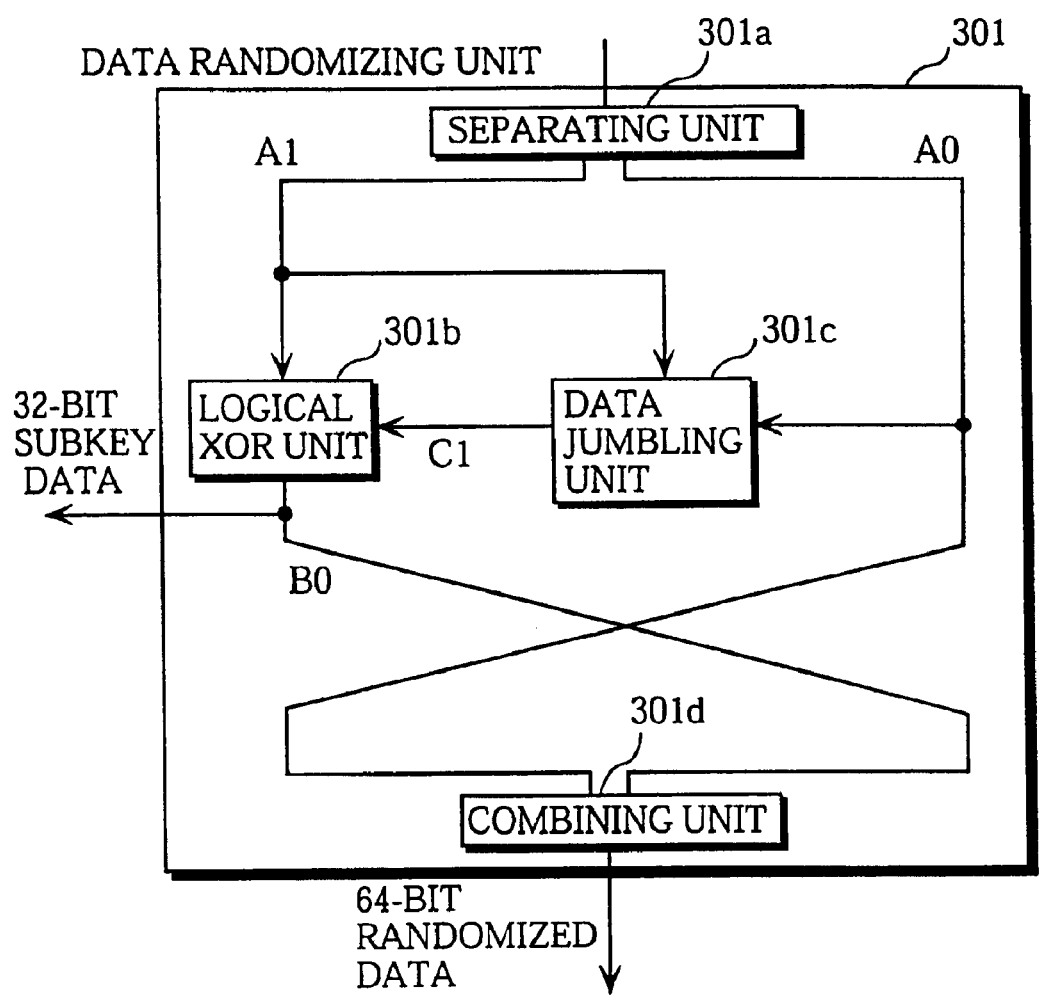
FIG. 4 is a block diagram showing the construction of the data randomizing unit 301.

As shown in FIG. 4, the data randomizing unit 301 is constructed of a separating unit 301$a$, a logical XOR unit 301$b$, a data jumbling unit 301$c$, and a combining unit 301$d$.

Separating Unit 301$a$

The separating unit 301$a$ receives 64-bit data from the number of stages control unit 303 and separates this data into the upper 32 bits (hereafter called "data A1") and the lower 32 bits (hereafter called "data A0"). The separating unit 301$a$ outputs the data A1 to the logical XOR unit 301$b$ and the data jumbling unit 301$c$, and the data A0 to the combining unit 301$d$ and the data jumbling unit 301$c$.

Data Jumbling Unit 301$c$

The data jumbling unit 301$c$ receives the data A0 and the data A1 from the separating unit 301$a$, takes an exclusive OR for each bit in the data A0 and the data A1, and so obtains 32-bit data. The data jumbling unit 301c separates this data into four sets of 8-bit data, performs a predetermined substitution for each set of eight-bit data and so generates four sets of 8-bit data. The predetermined substitution referred to here is performed using a table that stores 256 8-bit values that have been assigned address values from "0" to "255".

After this, the data jumbling unit 301c generates 32-bit data by combining the four sets of 8-bit data it has generated. The data jumbling unit 301c transposes a specific bits in this 32-bit value to generate the new 32-bit data C1 which it outputs to the logical XOR unit 301b.

Logical XOR Unit 301b

The logical XOR unit 301b receives the data A1 from the separating unit 301a and the 32-bit data C1 from the data jumbling unit 301c. The logical XOR unit 301b takes a logical XOR for each bit in the data A1 and the data C1 to generate the 32-bit subkey data B0. The logical XOR unit 301b then outputs this subkey data B0 to the randomized data storing unit 302 and the combining unit 301d.

Combining Unit 301d

The combining unit 301d receives the data A0 from the separating unit 301a and the subkey data B0 from the logical XOR unit 301b. The combining unit 301d combines the data A0 and the subkey data B0 to generate 64-bit randomized data that has the data A0 as the upper 32 bits and the subkey data B0 as the lower bits. The combining unit 301d outputs this 64-bit randomized data to the number of stages control unit 303.

(b) Number of Stages Control Unit 303

The number of stages control unit 303 operates as described below to have the data randomizing unit 301 repeat the data randomizing process.

The number of stages control unit 303 is equipped with a region for storing (1) a processing iteration number showing a total number of times the data randomizing unit 301 has performed the randomizing process and (2) a maximum number of iterations.

The number of stages control unit 303 receives the input subkey data from the logical XOR unit 102 or the 64-bit randomized data from the data randomizing unit 301. The number of stages control unit 303 also receives a control signal from the subkey data generation control unit 106. When the received control signal is "1", the maximum number of iterations is set at "16". When the received control signal is "0", the maximum number of iterations is set at "2". On receiving a control signal, the number of stages control unit 303 resets the processing iteration number to "0".

The number of stages control unit 303 receives the input key data or randomized key data, adds one to the processing iteration number and compares the processing iteration number with the maximum number of iterations. If the processing iteration number is equal to the maximum number of iterations, the number of stages control unit 303 outputs the input key data or randomized key data it has received to the data randomizing unit 301 to complete the repeated processing. If the processing iteration number is below the maximum number of iterations, the number of stages control unit 303 outputs the input key data or randomized key data it has received to the data randomizing unit 301 and has another iteration of the repeated processing performed.

Note that during the first iteration of the repeated processing, the number of stages control unit 303 outputs the input key data it has received to the data randomizing unit 301. In the second and following iterations, the number of stages control unit 303 outputs the randomized data it has received to the data randomizing unit 301.

As described above, the number of stages control unit 303 controls the data randomizing unit 301 to have it perform the randomizing process twice or sixteen times. When a $(T*n)^{th}$ (where n=0,1, . . . ) plaintext block is being encrypted, the repeated processing has the data randomizing unit 301 output sixteen sets of subkey data to the randomized data storing unit 302. However, in all other cases the data randomizing unit 301 outputs two sets of subkey data to the randomized data storing unit 302.

(c) Randomized Data Storing Unit 302

The randomized data storing unit 302 receives a control signal from the subkey data generation control unit 106. The randomized data storing unit 302 also sequentially receives sixteenth sets of subkey data or two sets of subkey data from the data randomizing unit 301. The sixteen sets of subkey data are respectively numbered $SK_0$ to $SK_{15}$, while the two sets of subkey data are respectively numbered $SK_0$ and $SK_1$. After receiving such data, the randomized data storing unit 302 stores either the sixteen sets of subkey data $SK_0$ to $SK_{15}$ or the two sets of subkey data $SK_0$ and $SK_1$.

Figure 5A:
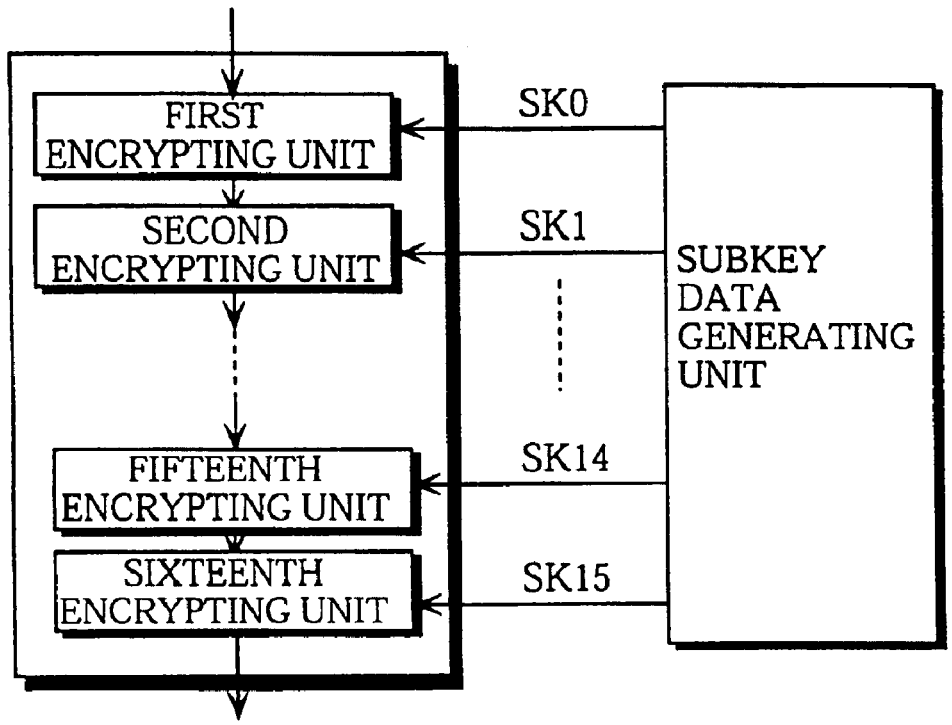
FIG. 5A and FIG. 5B are conceptual drawings showing which of the plurality of sets of subkey data generated by the subkey data generating unit 101 is used by each of the first to sixteenth encrypting units of the encrypting unit 100, with FIG. 5A showing the case where the subkey data generating type is A and FIG. 5B showing the case where the subkey data generating type is B.

As shown in FIG. 5A, when the received control signal is "1", the randomized data storing unit 302 reads the stored sets of subkey data $SK_0$ to $SK_{15}$ and outputs these sets of subkey data $SK_0$ to $SK_{15}$ to the first to sixteenth encrypting units.

Figure 5B:
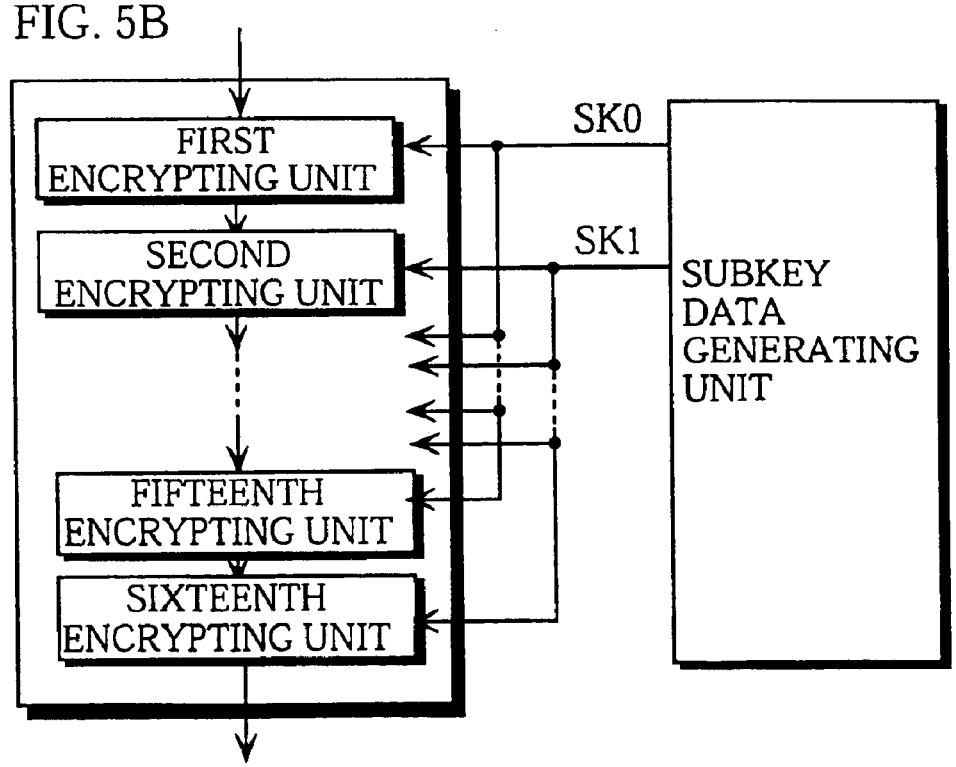

As shown in FIG. 5B, when the received control signal is "0", the randomized data storing unit 302 reads the stored sets of subkey data $SK_0$ and $SK_1$ and then sets $SK_{14}=SK_{12}=SK_{10}=SK_8=SK_6=SK_4=SK_2=SK_0$ and $SK_{15}=SK_{13}=SK_{11}=SK_9=SK_7=SK_5=SK_3=SK_1$. Having done so, the randomized data storing unit 302 outputs the sets of subkey data $SK_0$ to $SK_{15}$ to the first to sixteenth encrypting units.

The sets of subkey data $SK_0$ to $SK_{15}$ are respectively used as the first to sixteenth sets of subkey data.

(9) Counter Unit 105

The counter unit 105 is equipped with an internal region for storing a count value. This count value is initialized using the initial value "0".

The counter unit 105 receives completion information from the encrypting unit 100. This information shows that the encryption of one plaintext block is complete. On receiving the completion information, the counter unit 105 adds "1" to the count value. When adding "1" to a count value that is already "$2^{10}-1$", the counter unit 105 resets the count value to "0".

(10) Subkey Data Generation Control Unit 106

The subkey data generation control unit 106 reads the count value from the counter unit 105. When the count value is "0", the subkey data generation control unit 106 outputs a control signal with the value "1" to the subkey data generating unit 101. When the count value is not "0", the subkey data generation control unit 106 outputs a control signal with the value "0".

(11) Register Control Unit 107

The register control unit 107 also reads the count value from the counter unit 105. When the count value is "0", the register control unit 107 outputs a control signal with the value "1" to the register unit 104. When the count value is not "0", the register control unit 107 outputs a control signal with the value "0" to the register unit 104.

(12) Block Combining Unit 109

The block combining unit 109 sequentially receives the ciphertext blocks $C_t$ from the encrypting unit 100 and receives information showing the completion of output from the block dividing unit 108.

On receiving information showing the completion of output, the block combining unit 109 combines all of the received ciphertext blocks $C_t$ (t=0,1,2, . . . ) in the order it received them to generate the ciphertext data C. The block combining unit 109 outputs this ciphertext data C to the transmitting unit 11.

1.3 Construction of the Data Decrypting Unit 20

Figure 7:
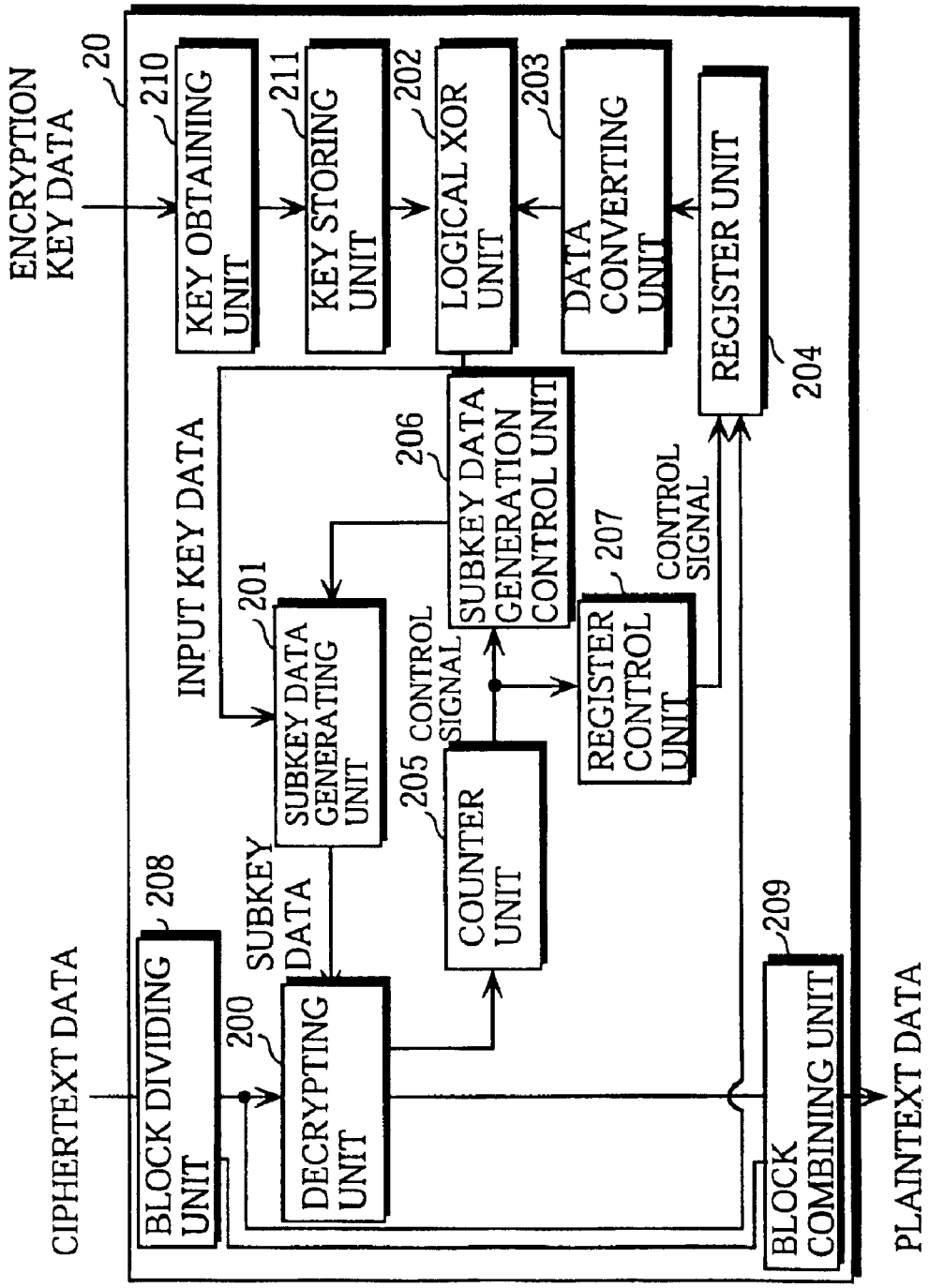
FIG. 7 is a block diagram showing the construction of the data decrypting unit 20 in the reception apparatus 2.

As shown in FIG. 7, the data decrypting unit 20 includes a decrypting unit 200, a subkey data generating unit 201, a logical XOR unit 202, a data converting unit 203, a register unit 204, a counter unit 205, a subkey data generation control unit 206, a register control unit 207, a block dividing unit 208, a block combining unit 209, a key obtaining unit 210, a key storing unit 211.

The subkey data generating unit 201, the logical XOR unit 202, the data converting unit 203, the register unit 204, the counter unit 205, the subkey data generation control unit 206, the register control unit 207, the key obtaining unit 210, and the key storing unit 211 of the data decrypting unit 20 respectively have the same constructions as the subkey data generating unit 101, the logical XOR unit 102, the data converting unit 103, the register unit 104, the counter unit 105, the subkey data generation control unit 106, the register control unit 107, the key obtaining unit 110, and the key storing unit 111 of the data encrypting unit 10. Accordingly, the following explanation will only focus on the differences between the data decrypting unit 20 and the data encrypting unit 10.

(1) Block Dividing Unit 208

The block dividing unit 208 receives the ciphertext data C from the receiving unit 21 and divides the received ciphertext data C into a plurality of ciphertext blocks $C_t$ (where t=0,1,2, . . . ) Each ciphertext block $C_t$ is 64 bits long. The block dividing unit 208 outputs each ciphertext block Ct it generates to the decrypting unit 200 in order.

The block dividing unit 208 also sequentially outputs the preceding ciphertext block $C_{t-1}$ to the register unit 204. When outputting the first ciphertext block Co to the decrypting unit 200, the block dividing unit 208 does not output any data to the register unit 204.

On completing the output of all of the ciphertext blocks, the block dividing unit 208 outputs information showing the completion of output to the block combining unit 209.

(2) Decrypting Unit 200

The decrypting unit 200 uses the data decryption part of a FEAL encryption method.

The decrypting unit 200 includes first to sixteenth decrypting units (not illustrated).

The first decrypting unit receives a ciphertext block Ct from the block dividing unit 208 and first subkey data SK0 from the subkey data generating unit 201. The first subkey data SK0 is 32 bits long. The first decrypting unit decrypts the received ciphertext block Ct using the first subkey data SK0 and so generates a first intermediate block. The first decrypting unit outputs this first intermediate block to the second decrypting unit.

The second to fifteenth decrypting units respectively receive a first to fourteenth intermediate block from a preceding decrypting unit out of the first to fourteenth decrypting units in addition to corresponding subkey data out of the second to fifteenth subkey data $SK_1$ to $SK_{14}$ from the subkey data generating unit 201. Each of the second to fifteenth subkey data $SK_1$ to $SK_{14}$ is 32 bits long. The second to fifteenth decrypting units respectively decrypt the first to fourteenth intermediate blocks using the second to fifteenth subkey data $SK_1$ to $SK_{14}$ to generate the second to fifteenth intermediate blocks which are outputted to the third to sixteenth decrypting units.

The sixteenth decrypting unit receives the fifteenth intermediate block from the fifteenth decrypting unit and the sixteenth subkey data $SK_{15}$ from the subkey data generating unit 201. This sixteenth subkey data $SK_{15}$ is 32 bits long. The sixteenth decrypting unit decrypts the fifteenth intermediate block using the sixteenth subkey data $SK_{15}$ to generate the plaintext block $D_t$.

$$D_t=Dec(C_t,SK1_t) \qquad \text{Equation 14}$$

Here, $Dec(C_t,SK1_t)$ represents the decrypting of the ciphertext $C_t$ using the set $SK1_t$ ($SK_0$ to $SK_{15}$) of subkey data that is generated during the $t^{th}$ decryption process.

The sixteenth decrypting unit outputs the plaintext block $D_t$ it generates to the block combining unit 209.

After outputting the generated plaintext block $D_t$ to the block combining unit 209, the encrypting unit 100 outputs the completion information, which shows that the decrypting of one ciphertext block has been completed, to the counter unit 205.

(3) Counter Unit 205

The counter unit 205 receives completion information showing that the decrypting of one ciphertext block has been completed by the decrypting unit 200. On receiving this information, the counter unit 205 adds "1" to the count value.

(4) Register Unit 204

The register unit 204 is equipped with regions for storing a 64-bit initial value IV and 64-bit stored data. In an initial state, the 64-bit stored data is set at the initial value IV.

The register unit 204 receives the previous ciphertext block $C_{t-1}$ from the block dividing unit 208.

The register unit 204 receives a control signal from the register control unit 207. When the received control signal is "0", and the register unit 204 has received a ciphertext block $C_{t-1}$ from the block dividing unit 208, the register unit 204 stores received ciphertext block $C_{t-1}$ as the stored data after the decrypting unit 200 outputs the plaintext block $D_{t-1}$ at the end of the data decrypting process for the current ciphertext block. When the control signal is "1", the register unit 204 reads the initial value IV and stores it as the stored data.

Putting this another way, when decrypting the $(T*n)^{th}$ ciphertext block (where n=0,1,2, . . . ), the register unit 204 initializes the stored value using the initial value IV that is set in advance. In all other cases, the register unit 204 stores the preceding ciphertext block $C_{t-1}$. As mentioned before, the value "T" is a value indicating a predetermined cycle.

(5) Block Combining Unit 209

The block combining unit 209 sequentially receives the plaintext blocks $D_t$ from the decrypting unit 200 and receives information showing the completion of output from the block dividing unit 208.

On receiving information showing the completion of output, the block combining unit 209 combines the received plaintext blocks $D_t$ (t=0,1,2, . . . ) in the order it received them to generate the plaintext data D. The block combining unit 109 outputs this plaintext data D to the decrypted data storing unit 22.

(6) Data Converting Unit 203

The data converting unit 203 reads the 64-bit stored data from the register unit 204. On decrypting the $t^{th}$ ciphertext block $C_t$ the encrypting unit 100 reads the 64-bit stored data $R1_t$ shown below.

When $t \neq T*k(k=0,1, . . . )$ $$R1_t=C_{t-1} \qquad \text{Equation 8}$$

When $t=T*k(k=0,1, . . . )$ $$R1_t=IV \qquad \text{Equation 9}$$

The data converting unit 203 next subjects the stored data $R1_t$ it has read to a predetermined data conversion f to generate $S1_t$.

$$S1_t = f(R1_t) \qquad \text{Equation 10}$$

Here, f(X) represents the value generated when the data converting unit 203 subjects the input data X to the data conversion f.

(7) Logical XOR Unit 202

The logical XOR unit 202 receives the 64-bit data $S1_t$ from the logical XOR unit 202 and generates the input key data $IK1_t$.

$$IK1_t = S1_t(+)EK \qquad \text{Equation 11}$$

(8) Subkey Data Generating Unit 201

The subkey data generating unit 201 generates sixteen sets of 32-bit subkey data (the first to sixteenth subkey data $SK_0$ to $SK_{15}$).
When $t \neq T*k(k=0,1,\ldots)$ $$SK1_t = KGB(IK1_t) \qquad \text{Equation 12}$$

Here, KGB(X) represents the sixteen sets of subkey data that are generated by the type B subkey generating process using the input key data X. These sixteen sets of subkey data are composed of two types of subkey data.
When $t = T*k(k=0,1,\ldots)$ $$SK1_t = KGA(IK1_t) \qquad \text{Equation 13}$$

Here, KGA(X) represents the sixteen sets of subkey data that are generated by the type A subkey generating process using the input key data X. These sixteen sets of subkey data each differ from one another.

2. Operation of the Encrypted Communication System 5

The following describes the operation of the encrypted communication system 5.

2.1 Operation of the Transmission Apparatus 1

The following describes the operation of the transmission apparatus 1.

(1) Overall Operation of the Transmission Apparatus 1

Figure 8:
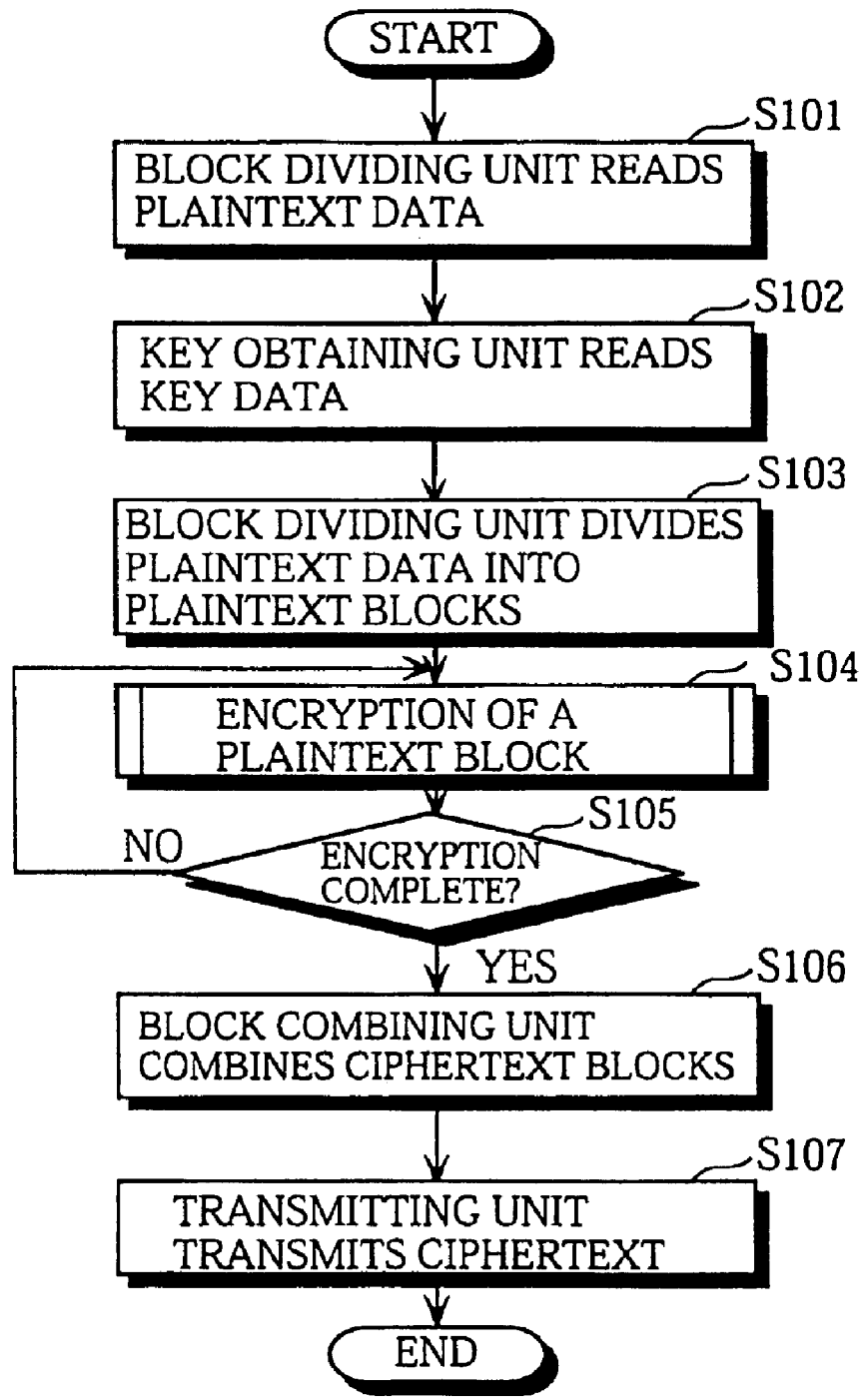
FIG. 8 is a flowchart showing the overall operation of the transmission apparatus 1.

The following describes the overall operation of the transmission apparatus 1 with reference to the flowchart shown in FIG. 8.

The counter unit 105 sets the count value at "0", the register unit 104 sets the stored data at the initial value IV, and the block dividing unit 108 reads the plaintext data from the plaintext data storing unit 12 (step S101). The key obtaining unit 110 reads the encryption key data from the encryption key data storing unit 13 and writes the read encryption key data into the key storing unit 111 (step S102). The block dividing unit 108 divides the read plaintext data into a plurality of plaintext blocks (step S103).

The block dividing unit 108 outputs each plaintext block to the encrypting unit 100. The encrypting unit 100 receives a plaintext block from the block dividing unit 108, encrypts the plaintext block to generate a ciphertext block, and outputs the generated ciphertext block to the block combining unit 109 (step S104). When all of the plaintext blocks have not been encrypted (step S105:No), the processing returns to S104.

On completing the output of all of the plaintext blocks (S105:Yes), the block dividing unit 108 outputs information showing the completion of output to the block combining unit 109. The block combining unit 109 combines all of the ciphertext blocks it has received in order to generate the ciphertext data which it outputs to the transmitting unit 11 (step S106).

The transmitting unit 11 receives the ciphertext data and subjects the received ciphertext data to a parallel-to-serial conversion, modulation, and amplification to generate signals. The transmitting unit 11 transmits these signals to the reception apparatus 2 via the transfer path 3 (step S107).

(2) Operation of the Data Encrypting Unit 10

Figure 9:
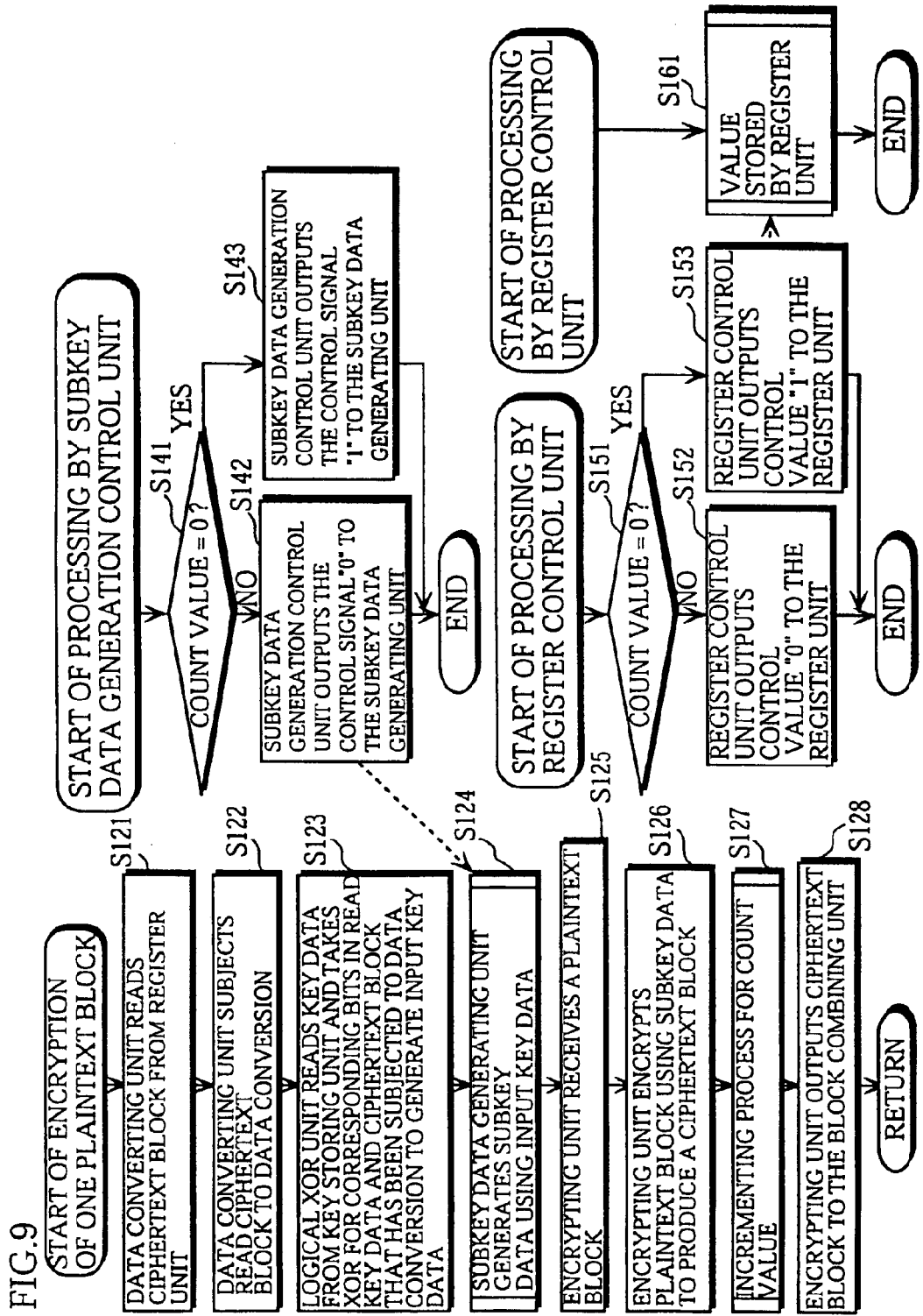
FIG. 9 is a flowchart showing the operation of the data encrypting unit 10 of the transmission apparatus 1.

The following describes the operation of the data encrypting unit 10 with reference to the flowchart in FIG. 9.

The data converting unit 103 first reads the 64-bit stored data from the register unit 104 (step S121), subjects the read data to a predetermined data conversion, and outputs the resulting 64-bit data to the logical XOR unit 102 (step S122).

The logical XOR unit 102 receives the 64-bit data from the data converting unit 103, reads the encryption key data from the key storing unit 111, takes a logical XOR for corresponding bits in the received 64-bit data and the read encryption key data to generate 64-bit input key data. The logical XOR unit 102 outputs the generated input key data to the subkey data generating unit 101 (step S123).

The subkey data generating unit 101 generates a plurality of sets of subkey data using the input key data and outputs each generated set of subkey data to a different encrypting unit in the first to sixteen encrypting units in the encrypting unit 100 (step S124).

The encrypting unit 100 receives a plaintext block from the block dividing unit 108 (step S125), encrypts the plaintext block using the plurality of sets of subkey data and so generates a ciphertext block (step S126). The counter unit 105 adds "1" to the count value (step S127). The encrypting unit 100 outputs the ciphertext block to the block combining unit 109 (step S128).

The subkey data generation control unit 106 reads the count value from the counter unit 105. When the count value is "0" (step S141:Yes), the subkey data generation control unit 106 outputs a control signal with the value "1" to the subkey data generating unit 101 (step S143). Conversely, when the count value is not "0" (step S141:No), the subkey data generation control unit 106 outputs a control signal with the value "0" to the subkey data generating unit 101 (step S142).

The register control unit 107 also reads the count value of the counter unit 105. When the count value is "0" (step S151:Yes), the register control unit 107 outputs a control signal with the value "1" to the register unit 104 (step S153). Conversely, when the count value is not "0" (step S151:No), the register control unit 107 outputs a control signal with the value "0" to the register unit 104 (step S152).

The register unit 104 stores a value in accordance with the control signal received from the register control unit 107 (step S161).

(3) Operation of the Counter Unit 105

Figure 10:
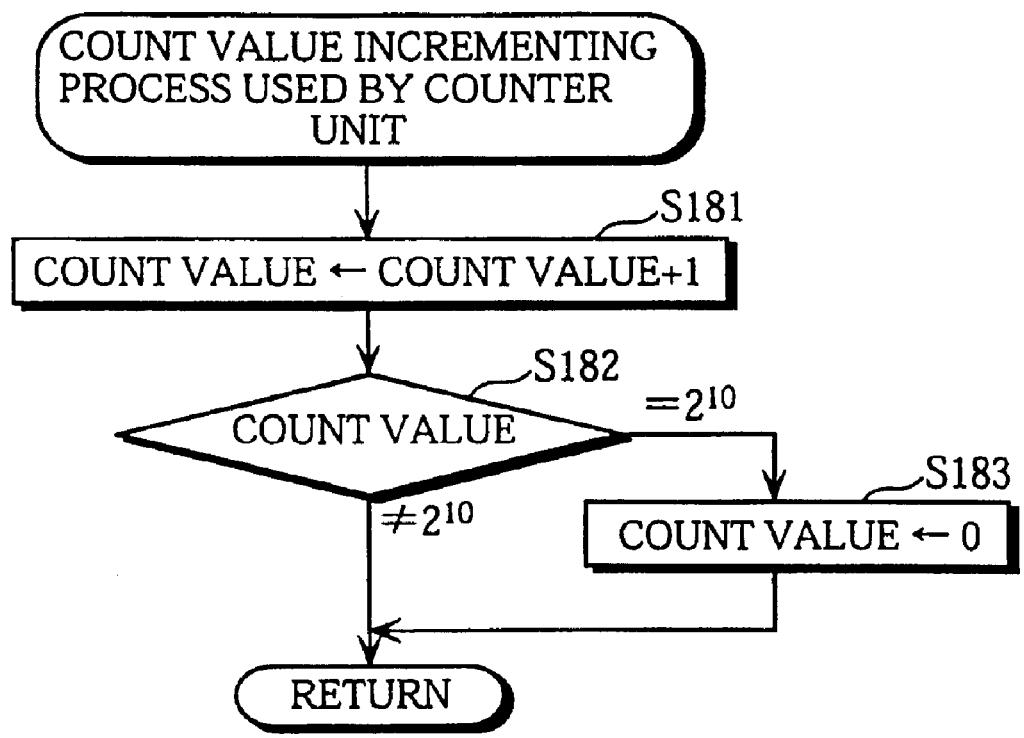
FIG. 10 is a flowchart showing the operation of the counter unit 105 in the data encrypting unit 10.

The following describes the operation of the counter unit 105 with reference to the flowchart shown in FIG. 10.

On receiving a completion signal from the encrypting unit 100 showing that the encryption of one plaintext block has been completed, the counter unit 105 adds "1" to the count value (step S181). When the count value reaches $2^{10}$ (step S182:Yes) the counter unit 105 resets the count value to "0" (step S183).

(4) Operation of the Register Unit 104

Figure 11:
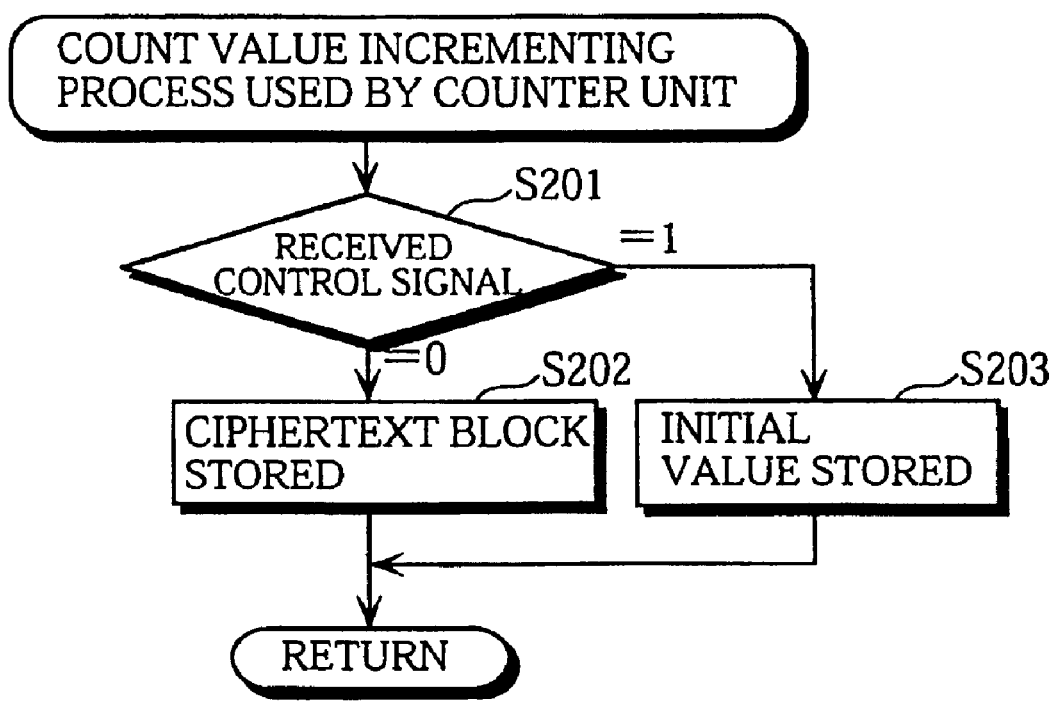
FIG. 11 is a flowchart showing the operation of the register unit 104 in the data encrypting unit 10.

The following describes the operation of the register unit 104 with reference to the flowchart in FIG. 11.

The register unit 104 receives a control signal from the register control unit 107. When the received control signal is "0" (step S201:"=0") and a ciphertext block is received from the sixteenth encrypting unit 100d, the register unit 104 stores this ciphertext block as the stored data (step S202). When the received control signal is "1" (step S201:"=1"), the register unit 104 reads the initial value IV and stores the initial value as the stored data (step S203).

(5) Operation of the Subkey Data Generating Unit 101

Figure 12:
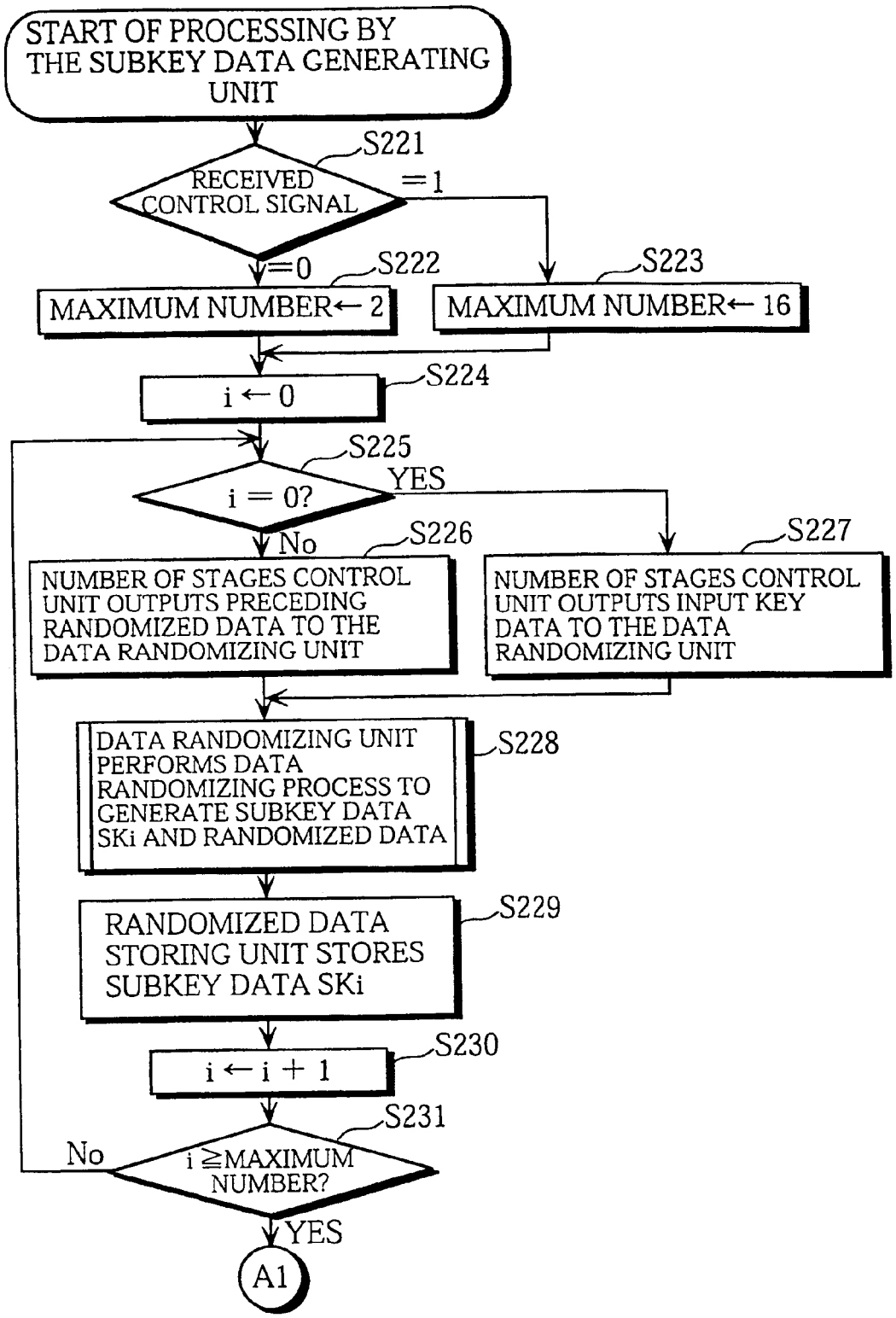
FIG. 12 is a flowchart showing a former part of the operation of the subkey data generating unit 101 in the data encrypting unit 10.
Figure 13:
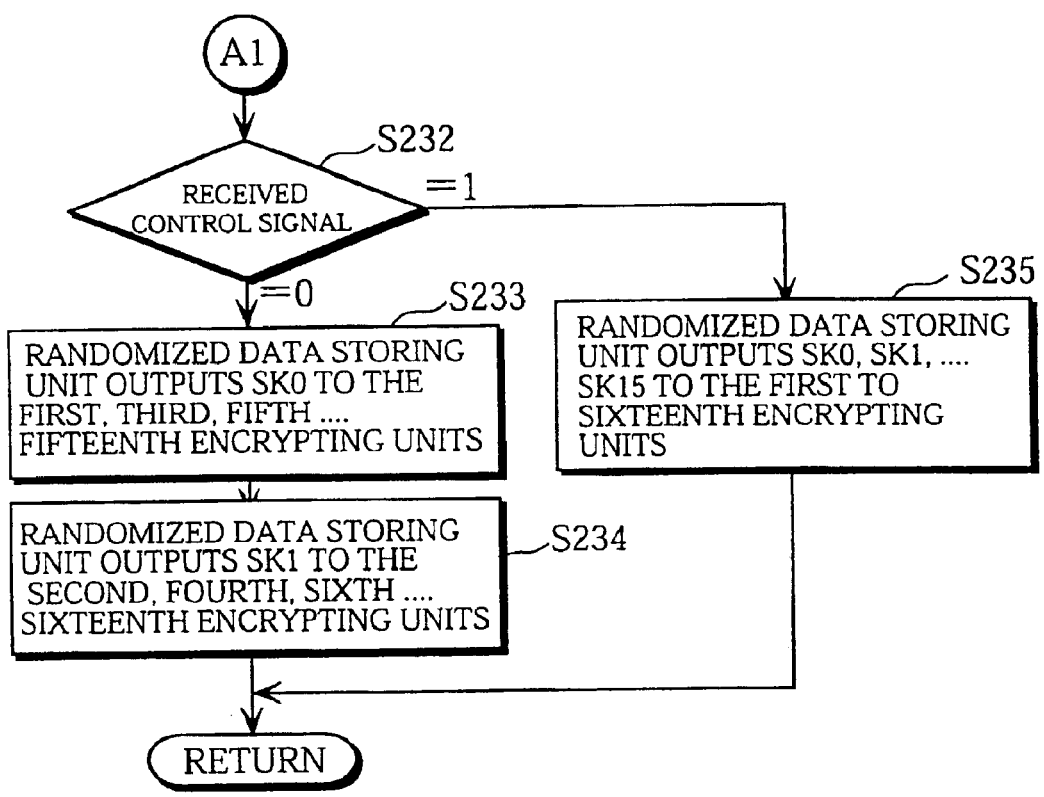
FIG. 13 is also a flowchart showing a latter part of the operation of the subkey data generating unit 101 in the data encrypting unit 10.

The following describes the operation of the subkey data generating unit 101 with reference to the flowcharts in FIGS. 12 and 13.

The number of stages control unit 303 of the subkey data generating unit 101 receives a control signal from the subkey data generation control unit 106. When the received control signal is "1" (step S221:"=1"), the number of stages control unit 303 sets the maximum number at 16 (step S223), while when the received control signal is "0" (step S221:"=0"), the number of stages control unit 303 sets the maximum number at 2 (step S222). On receiving the control signal, the number of stages control unit 303 also sets the iteration number "i" at "0" (step S224).

The number of stages control unit 303 receives either input key data or randomized data. In the first iteration (step S225:Yes), the number of stages control unit 303 outputs the input key data to the data randomizing unit 301 (step S227). In the second and following iterations (step S225:No), the number of stages control unit 303 outputs the randomized data to the data randomizing unit 301 (step S226).

The data randomizing unit 301 performs a data randomizing process and so generates the subkey data and randomized data (step S228). The randomized data storing unit 302 stores the subkey data (step S229). Next, the number of stages control unit 303 adds "1" to the value of the iteration number i (step S230) and compares the resulting iteration number with the maximum number. When the iteration number is below the maximum number (step S231:Yes), the processing returns to step S225 and the above procedure is repeated.

When the iteration number is at least equal to the maximum number (step S231:Yes), the repeated processing is completed. The randomized data storing unit 302 then receives a control signal from the subkey data generation control unit 106. When the received control signal is "1" (step S232), the randomized data storing unit 302 reads the stored sets of subkey data $SK_0$ to $SK_{15}$ and outputs the read sets of subkey data $SK_0$ to $SK_{15}$ to the first to sixteen encrypting units (step S235).

When the received control signal is "0" (step S232), the randomized data storing unit 302 reads the stored sets of subkey data $SK_0$ and $SK_1$, sets $SK_{14}=SK_{12}=SK_{10}=SK_8=SK_6=SK_4=SK_2=SK_0$ and $SK_{15}=SK_{13}=SK_{11}=SK_9=SK_7=SK_5=SK_3=SK_1$, and outputs the sets of subkey data $SK_0$ to $SK_{15}$ to the first to sixteenth encrypting units (steps S233 and S234).

(6) Operation of the Data Randomizing Unit 301

Figure 14:
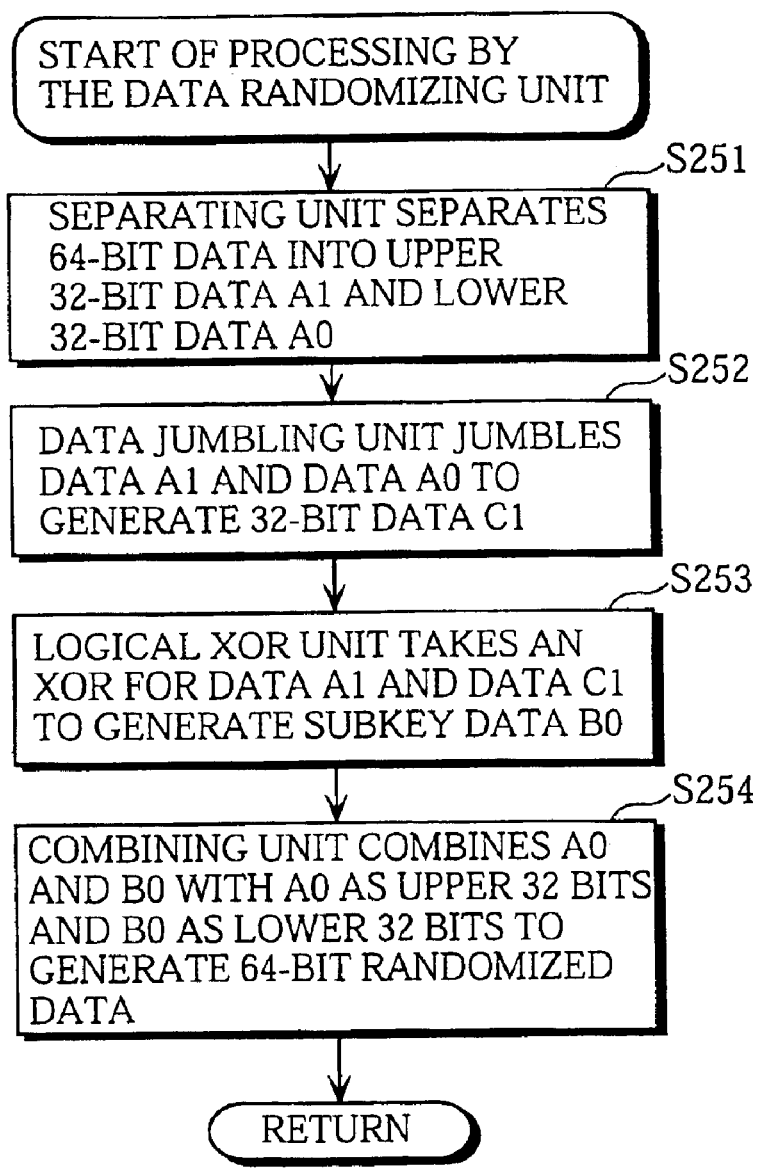
FIG. 14 is a flowchart showing the operation of the data randomizing unit 301 in the subkey data generating unit 101.

The following describes the operation of the data randomizing unit 301 with reference to the flowchart in FIG. 14.

The separating unit 301a receives 64-bit data from the number of stages control unit 303 and separates the received 64-bit data to generate the upper 32-bit data A1 and the lower 32-bit data A0. The separating unit 301a outputs the data A1 to the logical XOR unit 301b and the data jumbling unit 301c, and outputs the data A0 to the combining unit 301d and the data jumbling unit 301c (step S251).

The data jumbling unit 301c receives the data A0 and the data A1 from the separating unit 301a, takes a logical XOR for corresponding bits in the data A0 and the data A1 to generate 32-bit data, and separates this 32-bit data into four sets of 8-bit data. The data jumbling unit 301c then performs a predetermined substitution on each set of 8-bit data and combines the resulting sets of modified 8-bit data to generate a new set of 32-bit data. The data jumbling unit 301c also replaces predetermined bits in the 32-bit data with other bits to generate the 32-bit data C1 which it outputs to the logical XOR unit 301b (step S252).

The logical XOR unit 301b receives the data A0 from the separating unit 301a and the 32-bit data C1 from the data jumbling unit 301c and takes a logical XOR for corresponding bits in the data A0 and the data C1 to generate the subkey data B0. The logical XOR unit 301b outputs this subkey data B0 to the randomized data storing unit 302 and the combining unit 301d (step S253).

The combining unit 301d receives the data A0 from the separating unit 301a and the subkey data B0 from the logical XOR unit 301b. The combining unit 301d combines the data A0 and the subkey data B0 with the data A0 as the upper bits and the subkey data B0 as the lower bits to generate 64-bit randomized data. The combining unit 301d outputs this 64-bit randomized data to the number of stages control unit 303 (step S254).

2.2 Operation of the Reception Apparatus 2

The following describes the operation of the reception apparatus 2.

(1) Overall Operation of the Reception Apparatus 2

The overall operation of the reception apparatus 2 is similar to the operation of the transmission apparatus 1, and so will also be explained with reference to the flowchart shown in FIG. 8.

The receiving unit 21 of the reception apparatus 2 receives signals from the transmitting unit 11 of the transmission apparatus 1 via the transfer path 3. The receiving unit 21 subjects the received signals to demodulation and serial-to-parallel conversion to generate a ciphertext. The counter unit 205 sets the count value at "0", and the register unit 204 sets the stored data at the initial value IV. The block dividing unit 208 receives the ciphertext data from the receiving unit 21 (this corresponds to step S101), and the key obtaining unit 210 reads the encryption key data from the encryption key data storing unit 23 and writes it into the key storing unit 211 (this corresponds to step S102). The block dividing unit 208 divides the ciphertext data into a plurality of ciphertext blocks (this corresponds to step S103).

The block dividing unit 208 outputs each ciphertext block to the decrypting unit 200. The decrypting unit 200 receives a ciphertext block from the block dividing unit 208, decrypts the received ciphertext block to generate a plaintext block, and outputs the resulting plaintext block to the block combining unit 209 (this corresponds to step S104). When the decrypting unit 200 has not completed the decryption of all of the ciphertext blocks (this corresponds to S105:No), the decrypting process is repeated.

When the outputting of all of the ciphertext blocks is complete (this corresponds to S105:Yes), the block dividing unit 208 outputs information showing the completion of output to the block combining unit 209. The block combining unit 209 combines all of the plaintext blocks it has received in order to generate plaintext data (this corresponds to step S106), and writes the generated plaintext data into the decrypted data storing unit 22 (this corresponds to step S107).

(2) Operation of the Data Decrypting Unit 20

The operation of the data decrypting unit 20 is similar to that of the data encrypting unit 10 and so is explained with reference to the flowchart in FIG. 9.

The data converting unit 203 reads the 64-bit stored data from the register unit 204 (this corresponds to step S121), performs a predetermined data conversion on the stored data, and outputs the converted 64-bit data to the logical XOR unit 202 (this corresponds to step S122).

The logical XOR unit 202 receives 64-bit data from the data converting unit 203, reads the encryption key data from the key storing unit 211, and takes a logical XOR for corresponding bits in the 64-bit data and encryption key data to generate 64-bit input key data. The logical XOR unit 202 outputs this input key data to the subkey data generating unit 201 (this corresponds to step S123).

The subkey data generating unit 201 generates a plurality of sets of subkey data using the input key data and outputs each generated set of subkey data to a different decrypting unit in the first to sixteenth decrypting units of the decrypting unit 200 (this corresponds to step S124).

The decrypting unit 200 receives a ciphertext block from the block dividing unit 208 (this corresponds to step S125), decrypts the ciphertext block using the plurality of sets of subkey data, and so generates a plaintext block (this corresponds to step S126). The counter unit 205 increments the count value (this corresponds to step S127). The decrypting unit 200 outputs the resulting plaintext block to the block combining unit 209 (this corresponds to step S128).

The operation of the subkey data generation control unit 206 is the same as the operation of the subkey data generation control unit 106 that is shown in steps S141 to S143 of the flowchart in FIG. 9, and so will not be explained.

The operation of the register control unit 207 is the same as the operation of the register control unit 107 that is shown in steps S151 to S153 of the flowchart in FIG. 9, and so will not be explained.

The register unit 204 stores a value in accordance with the control value it receives from the register control unit 207 (this is the same as step S161 in the flowchart in FIG. 9).

(3) Operation of the Counter Unit 205

The operation of the counter unit 205 is similar to that of the counter unit 105 and so is explained with reference to the flowchart in FIG. 10.

On receiving completion information from the decrypting unit 200 showing that it has completed the decrypting of one ciphertext block, the counter unit 205 adds one to the count value (this corresponds to step S181). When this addition results in the count value reaching $2^{10}$ (this corresponds to S181:Yes), the counter unit 205 resets the count value to zero (this corresponds to step S183).

(4) Operation of Register Unit 204

The operation of the register unit 204 is similar to that of the counter unit 105 and so is explained with reference to the flowchart in FIG. 11.

The register unit 204 receives a control signal from the register control unit 207. When the received control signal is "0" (step S201:Yes) and a previous ciphertext block is received from the block dividing unit 208, the register unit 204 stores this ciphertext block as the stored data (this corresponds to step S202). When the received control signal is "1" (this corresponds to step S201:No), the register unit 204 reads the initial value IV and stores the initial value IV as the stored data (this corresponds to step S203).

(5) Operation of the Subkey Data Generating Unit 201

The operation of the subkey data generating unit 201 is similar to that of the subkey data generating unit 101, so that the following description will focus on the differences with the procedure in the flowcharts shown in FIGS. 12 and 13.

In step S235, the randomized data storing unit 302 reads the stored subkey data $SK_0$ to $SK_{15}$ and outputs the respective sets of subkey data $SK_0$ to $SK_{15}$ to the corresponding first to sixteenth decrypting units in the decrypting unit 200.

In steps S233 and S234, the randomized data storing unit 302 reads the stored subkey data $SK_0$ and $SK_1$, sets $SK_{14}=SK_{12}=SK_{10}=SK_8=SK_6=SK_4=SK_2=SK_0$ and $SK_{15}=SK_{13}=SK_{11}=SK_9=SK_7=SK_5=SK_3=SK_1$, and outputs the respective sets of subkey data $SK_0$ to $SK_{15}$ to the corresponding first to sixteenth decrypting units in the decrypting unit 200.

(6) Operation of the Data Randomizing Unit 301

The operation of the data randomizing unit 301 in the subkey data generating unit 201 is the same as the operation of the data randomizing unit 301 in the subkey data generating unit 101 that was described using FIG. 14. No further explanation will be given.

3. Correspondence between the Plaintext and Decrypted Text

The ciphertext blocks $C_0, C_1, \ldots$ are obtained when the data encrypting unit 10 encrypts the plaintext block sequence $P_0, P_1, \ldots$ using the 64-bit encryption key data. These ciphertext blocks are decrypted by the data decrypting unit 20 using the same 64-bit encryption key data to generate the plaintext block sequence $D_0, D_1, \ldots$ that is the same as the plaintext block sequence $P_0, P_1, \ldots$. This is shown in more detail below.

Equation 15 is found from Equations 1 and 2 and Equations 8 and 9.

$$R0_t = R1_t \ (t=0,1,\ldots) \quad \text{Equation 15}$$

Equation 16 is found from Equation 15 and Equations 3 and 10.

$$S0_t = S1_t \ (t=0,1,\ldots) \quad \text{Equation 16}$$

Equation 17 is found from Equation 16 and Equations 4 and 11.

$$IK0_t = IK1_t \ (t=0,1,\ldots) \quad \text{Equation 17}$$

Therefore, Equation 18 is given by Equations 17 and 5 and Equations 12 and 13.

$$SK0_t = SK1_t \ (t=0,1,\ldots) \quad \text{Equation 18}$$

Equation 19 is found from Equations 7 and 14.

$$Dt = Dec(Enc(P_t, SK0_t), SK1_t) \ (t=0,1,\ldots) \quad \text{Equation 19}$$

The following relationship (Equation 20) is formed for any 64-bit data $\alpha, \beta$ in the functions Enc and Dec.

$$\alpha = Dec(Enc(\alpha, \beta) \beta) \quad \text{Equation 20}$$

Therefore, from Equations 19, 20, and 18

$$D_t = P_t$$

4. Evaluation of Security and Encryption Processing Speed (1) Security

In the present embodiment, the encryption of a $t^{th}$ (where $t \neq 2^{10} * k$ ($k=0,1,\ldots$)) plaintext block is performed using sixteen sets of 32-bit subkey data $SK_0, \ldots, SK_{15}$ that are inputted into the encrypting unit 100. As described earlier, these sets of subkey data are generated so that $SK_0=SK_2=SK_4 \ldots =S_4$ and $SK_1=SK_3=SK_5 \ldots =S_{15}$, so that security against known plaintext attacks is not as high as the conventional method where each set of subkey data is different.

However, the input key data $IK0_t$ used to encrypt these plaintext blocks is set so that $$IK0_t = EK(+)C_{t-1}$$

As there are $2_{64}$ potential values of $C_{t-1}$, it is practically impossible to obtain a large number of plaintext blocks that have been encrypted using the same $IK0_t$. This makes the present method secure against known plaintext attacks.

The encryption of a $t^{th}$ (where $t=2^{10}*k$ ($k=0,1,\ldots$)) plaintext block is also performed using sixteen sets of 32-bit subkey data $SK_0, \ldots, SK_{15}$ that are inputted into the encrypting unit 100. As described earlier, each of these sets of subkey data is different, so that security against known plaintext attacks is the same as with the stated conventional method.

(2) Encryption Processing Speed

The following describes the encryption processing speed of the data encrypting unit 10.

When a $t^{th}$ (where $t \neq 2^{10}*k$ ($k=0,1,\ldots$)) plaintext blocks $P_t$ is encrypted, the subkey data generating unit 101 performs a simple process that generates sixteen sets of 32-bit subkey data by generating what are effectively only two 32-bit sets of subkey data. This means that the generation of subkey data for each block has a lesser effect on the encryption processing speed that the stated conventional method.

5. Other Modifications

While the present invention has been explained by way of the embodiments given above, it should be obvious that the invention is not limited to the details given therein. Several modifications are possible, with representative example being given below.

(1) In the above embodiment, the logical XOR unit 102 (202) is described as a data merging means that takes an XOR for each bit in the 64-bit data generated by the data converting unit 103 (203) and the encryption data. However, the same effect can be achieved even if an XOR is not taken for every bit position.

(2) In the above embodiment, the data converting unit 103 (203) is described as outputting 64-bit converted data, though such data does not need to be 64 bits long. As one example, when the encryption key data is 56 bits long, a data converting unit that outputs 56-bit data may be used.

(3) In the above embodiment, the register unit 104 (204) receives an input of ciphertext data generated in the immediately preceding encryption process, though the 64-bit value obtained during the immediately preceding encryption process may be used. As one example, the first or second intermediate block generated during the encryption process may be used. The data used does not need to be 64 bits long, so that shorter data, such as a 40-bit value, may be used.

The following describes one possible arrangement when 40-bit data is used. The data converting unit 103 (203) receives the 40-bit data and converts the data to generate new 40-bit data. The key storing unit 111 stores 40-bit encryption key data. The logical XOR unit 102 takes a logical XOR for corresponding bits in the new 40-bit data and the 40-bit encryption key data to generate 40-bit input key data. The subkey data generating unit 101 generates sixteen sets of 20-bit subkey data which are used during encryption by the first to sixteenth encrypting units of the encrypting unit 100.

(4) In the above embodiment, the encrypting unit 100 uses a FEAL method, though any block encryption method may be used. As one example, DES (Data Encryption Standard) may be used.

The subkey data generating unit 101 is not limited to having the construction described above. As one example, the subkey data generating unit 101 may generate sixteen sets of 32-bit subkey data from 64-bit input key data.

(5) The present invention is not limited to a construction where the subkey data generating unit 101 uses two types of encryption processing where random numbers are generated using different processing loads. Any arrangement may be used, so long as the encryption processing used when the control signal "1" is inputted has a heavier load than the encryption processing used when the control signal "0" is inputted.

As one example, instead of generating two sets of subkey data, the subkey data generating unit may generate different data for the first 16 bits of each of the sixteen sets of subkey data and then generate the latter 16 bits of each set of subkey data based on the corresponding former 16 bits. Such processing will reduce the processing load of key generation in the same way as described above.

Instead of generating two sets of subkey data, the subkey data generating unit may generate three, four, five, or any other number up to fifteen sets of subkey data, with the first to sixteen encrypting units each using one of the generated sets of subkey data.

(6) The counter unit 105 (205) resets the count value to "0" when it reaches "$2^{10}-1$", although the invention is not limited to using "$2^{10}-1$" as the upper limit for the count value. Any positive integer maybe used. The count value also does not need to be reset to "0".

In the above embodiments, the apparatuses are described as internally storing 64-bit encryption key data. However, the apparatuses may instead only store 64-bit encryption key data that is used the first time encryption is performed, with the input key data that is used when encrypting each of the other plaintext blocks being encrypted and transferred with the plaintext blocks. When updating the input key data, public key encryption, such as the Diffie-Hellman method, may be used to distribute the input key data to the apparatuses that are to perform communication.

(7) The present invention also applies to the method used by the apparatuses described above. This method may be realized by computer programs that are executed by computers. Such computer programs may be distributed as digital signals.

The present invention may be realized by a computer-readable storage medium, such as a floppy disk, a hard disk, a CD-ROM (Compact Disc-Read Only Memory), an MO (magneto-optical) disc, a DVD (Digital Versatile Disc), a DVD-ROM, a DVD-RAM, or a semiconductor memory, on which computer programs and/or digital signals mentioned above are recorded. Conversely, the present invention may also be realized by a computer program and/or digital signal that is recorded on a storage medium.

Computer programs or digital signals that achieve the present invention may also be transmitted via a network, such as an electronic communication network, a wired or wireless communication network, or the Internet.

The present invention can also be realized by a computer system that includes a microprocessor and a memory. In this case, a computer program can be stored in the memory, with the microprocessor operating in accordance with this computer program.

The computer programs and/or digital signals may be provided to an independent computer system by distributing a storage medium on which the computer programs and/or digital signals are recorded, or by transmitting the computer programs and/or digital signals via a network. The independent computer may then execute the computer programs and/or digital signals to function as the present invention.

(8) The limitations described in the embodiment and the modifications may be freely combined.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An encryption method for use by an encryption apparatus that encrypts plaintext data composed of a plurality of blocks, the encryption method comprising:

a block obtaining step for obtaining the plaintext data one block at a time in order from outside the encryption apparatus;

a selecting step for selecting either a first mode or a second mode for a current block obtained in the block obtaining step according to how many blocks have been obtained;

a key generating step for generating
(1) a first group composed of a predetermined number n of different subkeys when the first mode is selected, and
(2) a second group composed of less than n different subkeys when the second mode is selected; and an encrypting step for encrypting the current block by subjecting the current block to n conversion processes in order, wherein in the first mode, each of the n conversion processes is associated with a different subkey in the first group and is performed using the associated subkey, and in the second mode, the n conversion processes are associated with subkeys in the second group and are each performed using the associated subkey.

2. An encryption method according to claim 1,
wherein the selecting step selects
(i) the first for blocks whenever a number of blocks that have been obtained is equal to a multiple of a predetermined value, and
(ii) the second mode for all other cases.

3. An encryption method according to claim 1,
wherein the encryption apparatus includes an initial value storing means for storing an initial value,
the encrypting step encrypts the current block to generate a ciphertext block having a predetermined length, and
the key generating step generates the first group using the initial value in the first mode and generates the second group using the initial value and the ciphertext block most recently generated by the encrypting step in the second mode.

4. An encryption apparatus for encrypting plaintext data composed of a plurality of blocks, the encryption apparatus comprising:

block obtaining means for obtaining the plaintext data one block at a time in order from outside;

selecting means for selecting either a first mode or a second mode for use with a current block obtained in the block obtaining means according to how many blocks have been obtained;

key generating means for generating
(1) a first group composed of a predetermined number n of different subkeys when the first mode is selected, and
(2) a second group composed of less than n different subkeys when the second mode is selected; and encrypting means for encrypting the current block by subjecting the current block to n conversion processes in order, wherein in the first mode, each of the n conversion processes is associated with a different subkey in the first group and is performed using the associated subkey, and in the second mode, the n conversion processes are each associated with a subkey in the second group and are each performed using the associated subkey.

5. A computer-readable storage medium storing an encryption program for use by a computer that encrypts plaintext data composed of a plurality of blocks, the encryption program comprising:

a block obtaining step for obtaining the plaintext data one block at a time in order from outside the encryption apparatus;

a selecting step for selecting either a first mode or a second mode for a current block obtained in the block obtaining step according to how many blocks have been obtained;

a key generating step for generating
(1) a first group composed of a predetermined number n of different subkeys when the first mode is selected, and
(2) a second group composed of less than n different subkeys when the second mode is selected; and an encrypting step for encrypting the current block by subjecting the current block to n conversion processes in order, wherein in the first mode, each of the n conversion processes is associated with a different subkey in the first group and is performed using the associated subkey, and in the second mode, the n conversion processes are associated with subkeys in the second group and are each performed using the associated subkey.

6. A decryption method for use by a decryption apparatus that decrypts ciphertext data in ciphertext block units, the decryption method comprising:

a block obtained step for obtaining the ciphertext data one ciphertext block at a time in order from outside the decryption apparatus;

a selecting step for selecting either a first mode or a second mode for use with a current ciphertext block obtained in the block obtaining step according to how many ciphertext blocks have been obtained;

a key generating step for generating
(1) a first group composed of a predetermined number n of different subkeys when the first mode is selected and
(2) a second group composed of less than n different subkeys when the second mode is selected; and a decrypting step for decrypting the current ciphertext block by subjecting the current ciphertext block to n conversion processes in order, wherein in the first mode, each of the n conversion processes is associated with a different subkey in the first group and is performed using the associated subkey, and in the second mode, the n conversion processes are associated with subkeys in the second group and are each performed using the associated subkey.

7. A decryption method according to claim 6,
wherein the selecting step selects
(1) the first mode whenever a number of ciphertext blocks that have been obtained is given as a multiple of a predetermined value, and
(2) the second mode for all other cases.

8. A decryption method according to claim 6,
wherein the decryption apparatus includes an initial value storing means for storing an initial value, the key generating step generating the first group using the initial value in the first mode and generating the second group using the initial value and the ciphertext block obtained immediately before the current ciphertext block in the second mode.

9. A decryption apparatus that decrypts ciphertext data in ciphertext block units, the decryption apparatus comprising:

block obtaining means for obtaining the ciphertext data one ciphertext block at a time in order from outside;

selecting means for selecting either a first mode or a second mode for use with a current ciphertext block obtained by the block obtaining means according to how many ciphertext blocks have been obtained;

key generating means for generating
  (1) a first group composed of a predetermined number n of different subkeys when the first mode is selected, and
  (2) a second group composed of less than n different subkeys when the second mode is selected; and decrypting means for decrypting the current ciphertext block by subjecting the current ciphertext block to n conversion processes in order, wherein in the first mode, each of the n conversion processes is associated with a different subkey in the first group and is performed using the associated subkey, and in the second mode, the n conversion processes are associated with subkeys in the second group and are each performed using the associated subkey.

10. A computer-readable storage medium storing a decryption program for use by a computer that decrypts ciphertext data in ciphertext block units, the decryption program comprising:

a block obtaining step for obtaining the ciphertext data one ciphertext block at a time in order from outside the decryption apparatus;

a selecting step for selecting either a first mode or a second mode for use with a current ciphertext block obtained in the block obtaining step according to how many ciphertext blocks have been obtained;

a key generating step for generating
  (1) a first group composed of a predetermined number n of different subkeys when the first mode is selected and
  (2) a second group composed of less than n different subkeys when the second mode is selected; and a decrypting step for decrypting the current ciphertext block by subjecting the current ciphertext block to n conversion processes in order, wherein in the first mode, each of the n conversion processes is associated with a different subkey in the first group and is performed using the associated subkey, and in the second mode, the n conversion processes are associated with subkeys in the second group and are each performed using the associated subkey.

* * * * *

UNITED STATES PATENT AND TRADEMARK OFFICE
CERTIFICATE OF CORRECTION

PATENT NO. : 6,917,684 B1 Page 1 of 1
APPLICATION NO. : 09/638616
DATED : July 12, 2005
INVENTOR(S) : Makoto Tatebayashi et al.

It is certified that error appears in the above-identified patent and that said Letters Patent is hereby corrected as shown below:

In the References Cited:
Under "Other Publications" two references are listed twice:
 Stallings, Williams "Cryptography and Network Security: Principles and Practice" is listed as the 2nd and 4th reference;
 Charnes, C. et al. "Comments on Soviet Encryption Algorithm" is listed as the 3rd and 5th reference.
These references are identical and should only be listed once.

In the Claims:
In Claim 2, Column 21, line 32, after the word "first" --mode-- should be added.
In Claim 6, Column 22, line 35, "obtained" should be "obtaining".

Signed and Sealed this

Fifteenth Day of August, 2006

JON W. DUDAS
*Director of the United States Patent and Trademark Office*